United States Patent
Toma et al.

(10) Patent No.: US 10,499,113 B2
(45) Date of Patent: Dec. 3, 2019

(54) TRANSMISSION METHOD, RECEPTION METHOD, TRANSMITTING APPARATUS, AND RECEIVING APPARATUS

(71) Applicant: Panasonic Intellectual Property Corporation of America, Torrance, CA (US)

(72) Inventors: Tadamasa Toma, Osaka (JP); Noritaka Iguchi, Osaka (JP); Hisaya Katou, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/063,595

(22) Filed: Mar. 8, 2016

(65) Prior Publication Data
US 2016/0192027 A1    Jun. 30, 2016

Related U.S. Application Data

(63) Continuation of application No. PCT/JP2014/004639, filed on Sep. 10, 2014.
(Continued)

(30) Foreign Application Priority Data

Aug. 29, 2014    (JP) .................. 2014-176180

(51) Int. Cl.
*H04N 21/6379*    (2011.01)
*H04N 21/426*    (2011.01)
(Continued)

(52) U.S. Cl.
CPC ......... *H04N 21/6379* (2013.01); *G11B 27/10* (2013.01); *H04N 19/436* (2014.11);
(Continued)

(58) Field of Classification Search
None
See application file for complete search history.

(56) References Cited

U.S. PATENT DOCUMENTS 9,661,107 B2 *  5/2017  Kim .................. H04L 69/22
9,883,185 B2 *  1/2018  Hendry .............. H04N 19/13
(Continued)

FOREIGN PATENT DOCUMENTS

JP     9-238309      9/1997
JP     2000-324489   11/2000
(Continued)

OTHER PUBLICATIONS

Extended European Search Report dated Jun. 24, 2016 in corresponding European Application No. 14846517.2.
(Continued)

*Primary Examiner* — Jason K Lin
(74) *Attorney, Agent, or Firm* — Wenderoth, Lind & Ponack, L.L.P.

(57) ABSTRACT

A transmission method includes: dividing a picture into a plurality of regions; generating a plurality of pieces of encoded data that respectively correspond to the plurality of regions by encoding the plurality of regions such that each of the plurality of regions can be decoded independently; packetizing the generated plurality of pieces of encoded data into a plurality of packets such that pieces of encoded data for different regions are not stored in a single packet; and transmitting the plurality of packets. By this, workload for generation of decoding target data is reduced.

8 Claims, 17 Drawing Sheets

Related U.S. Application Data

(60) Provisional application No. 61/880,312, filed on Sep. 20, 2013, provisional application No. 61/882,770, filed on Sep. 26, 2013.

(51) Int. Cl.
*H04N 21/845* (2011.01)
*H04N 19/436* (2014.01)
*G11B 27/10* (2006.01)
*H04N 21/438* (2011.01)
*H04N 21/85* (2011.01)

(52) U.S. Cl.
CPC ... *H04N 21/42615* (2013.01); *H04N 21/4382* (2013.01); *H04N 21/845* (2013.01); *H04N 21/8456* (2013.01); *H04N 21/85* (2013.01)

(56) References Cited

U.S. PATENT DOCUMENTS

| | | | | |
|---|---|---|---|---|
| 2002/0120885 | A1* | 8/2002 | Choi | G06F 8/65 714/38.1 |
| 2004/0218626 | A1* | 11/2004 | Tyldesley | H04N 21/238 370/464 |
| 2006/0045142 | A1* | 3/2006 | Nakamura | H04J 3/047 370/542 |
| 2006/0184790 | A1 | 8/2006 | Oliveira et al. | |
| 2007/0098007 | A1* | 5/2007 | Prodan | H04L 12/2801 370/443 |
| 2008/0040498 | A1* | 2/2008 | Setlur | H04N 21/631 709/231 |
| 2008/0285571 | A1* | 11/2008 | Arulambalam | H04L 29/06027 370/400 |
| 2010/0180043 | A1* | 7/2010 | Lau | H04N 21/23106 709/231 |
| 2012/0183074 | A1 | 7/2012 | Fuldseth | |
| 2012/0183079 | A1 | 7/2012 | Yoshimatsu et al. | |
| 2012/0320925 | A1 | 12/2012 | Park et al. | |
| 2013/0100248 | A1 | 4/2013 | Kadono | |
| 2013/0101035 | A1 | 4/2013 | Wang et al. | |
| 2013/0294747 | A1* | 11/2013 | Takahashi | H04N 21/2187 386/241 |
| 2014/0036999 | A1* | 2/2014 | Ryu | H04N 19/50 375/240.12 |
| 2014/0092302 | A1* | 4/2014 | Kumakura | H04N 21/2343 348/441 |
| 2014/0247875 | A1 | 9/2014 | Hattori et al. | |
| 2014/0348248 | A1* | 11/2014 | Ihara | H04N 21/242 375/240.26 |
| 2015/0208095 | A1* | 7/2015 | Schierl | H04N 19/70 375/240.28 |

FOREIGN PATENT DOCUMENTS

| | | |
|---|---|---|
| JP | 2001-078181 | 3/2001 |
| JP | 2003-324733 | 11/2003 |
| JP | 2005-123907 | 5/2005 |
| JP | 2009-505516 | 2/2009 |
| JP | 2010-136220 | 6/2010 |
| WO | 2012/153450 | 11/2012 |
| WO | 2013/065673 | 5/2013 |

OTHER PUBLICATIONS

Minhua Zhou, "AHG4: Enable parallel decoding with tiles", Joint Collaborative Team on Video Coding (JCT-VC) of ITU-T SG16 WP3 and ISO/IEC JTC1/SC29/WG11, 9th Meeting: Geneva, Switzerland, Apr. 27-May 7, 2012. pp. 1-9.

International Search Report of PCT application No. PCT/JP2014/004639 dated Dec. 16, 2014.

"Information technology—High efficiency coding and media delivery in heterogeneous environments—Part1:MPEG media transport (MMT)," ISO/IEC FDIS 23008-1, 2013.

Summons to attend Oral Proceedings dated Apr. 26, 2019 in European Patent Application No. 14846517.2.

Wiegand T et al.: "Overview of the H.264/AVC Video Coding Standard", IEEE Transactions on Circuits and Systems for Video Technology, Institute of Electrical and Electronics Engineers, US, vol. 13, No. 7, Jul. 1, 2003 (Jul. 1, 2003), pp. 560-576, XP011221093, ISSN: 1051-8215, DOI: 10.1109/TCSVT.2003.815165.

S. Wenger et al.: "RTP Payload Format for H.264 Video ; rfc3984. txt", RTP Payload Format for H.264 Video, RFC3984.TXT, Internet Engineering Task Force, IETF; Standard, Internet Society (ISOC) 4, Rue Des Falaises CH-1205, Geneva, Switzerland, Feb. 1, 2005, XP015009755.

\* cited by examiner

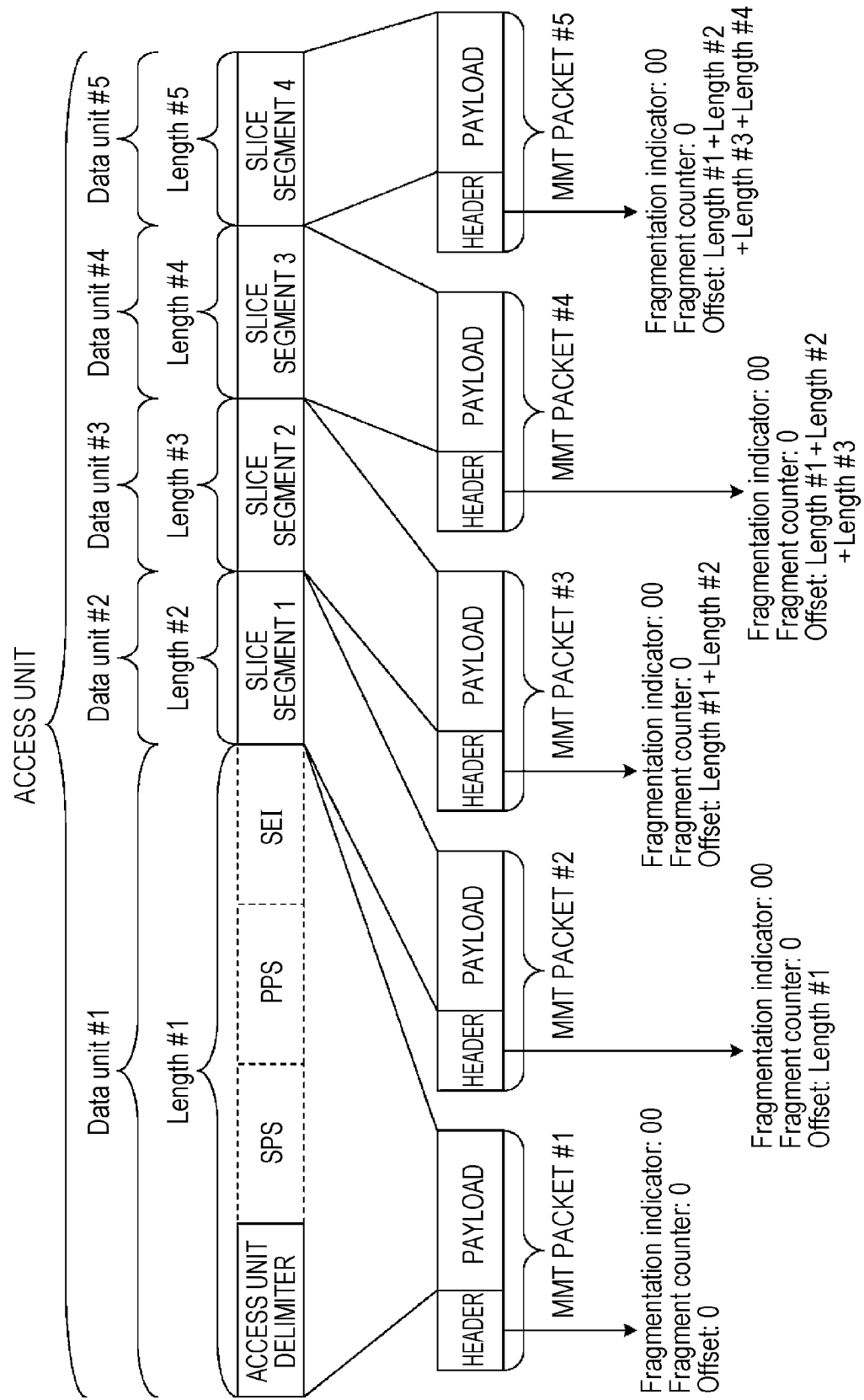

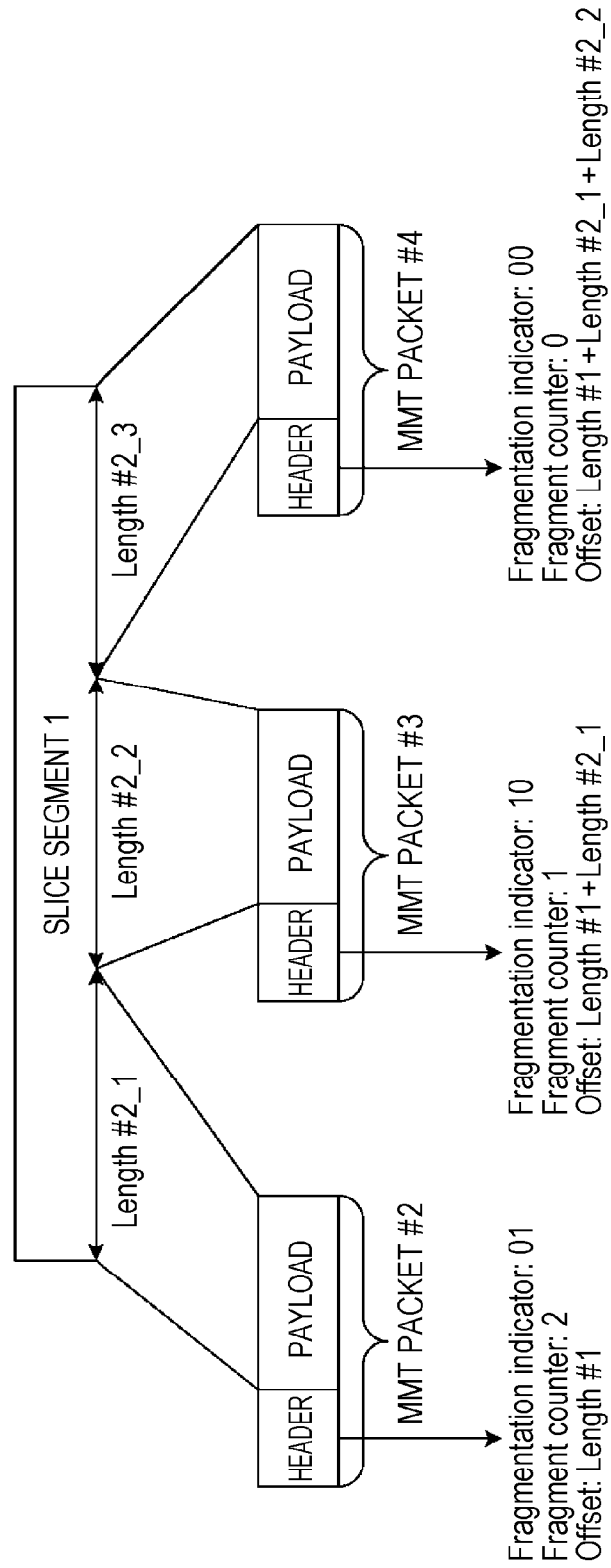

TRANSMISSION METHOD, RECEPTION METHOD, TRANSMITTING APPARATUS, AND RECEIVING APPARATUS

BACKGROUND

1. Technical Field

The present disclosure relates to a transmission method, a reception method, a transmitting apparatus, and a receiving apparatus.

2. Description of the Related Art

With the advancement of broadcasting and communication services, introduction of moving image content with ultra-high definition such as 8K (7680×4320 pixels: hereinafter, also called 8K4K) and 4K (3840×2160 pixels: hereinafter, also called 4K2K) is considered. A receiving apparatus needs to decode and display received encoded data of an ultra-high-definition moving image in real time. However, processing load for decoding is high, particularly, for a moving image with 8K resolution, etc. Thus, it is difficult for a single decoding device to decode such a moving image in real time. Accordingly, there is considered a method for parallelizing a decoding process using a plurality of decoding devices, by which processing load per decoding device is reduced, achieving a real-time process.

In addition, encoded data is multiplexed based on a multiplexing method, such as MPEG-2 TS (Transport Stream) or MMT (MPEG Media Transport), and then transmitted. For example, NPTL 1 discloses a technique for transmitting encoded media data on a packet-by-packet basis, according to MMT.

CITATION LIST

Non-Patent Literature

NPTL 1: Information technology—High efficiency coding and media delivery in heterogeneous environments—Part 1: MPEG media transport (MMT), ISO/IEC FDIS 23008-1

SUMMARY OF THE INVENTION

In one general aspect, the techniques disclosed here feature a transmission method including: dividing a picture into a plurality of regions; generating a plurality of pieces of encoded data that respectively correspond to the plurality of regions by encoding the plurality of regions such that each of the plurality of regions can be decoded independently; packetizing the generated plurality of pieces of encoded data into a plurality of packets such that pieces of encoded data for different regions are not stored in a single packet; and transmitting the plurality of packets.

It should be noted that general or specific embodiments may be implemented as a system, a method, an integrated circuit, a computer program, a storage medium, or any selective combination thereof.

The present disclosure can provide a transmission method or a reception method that can reduce workload for generation of decoding target data.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 17 is a diagram showing an example of MMT packets and header information according to the exemplary embodiment; and FIG. 18 is a diagram showing an example of MMT packets and header information according to the exemplary embodiment.

DESCRIPTION OF EMBODIMENT

Encoded data is multiplexed based on a multiplexing method, such as MPEG-2 TS or MMT, and then transmitted. Thus, prior to decoding, a receiving apparatus needs to separate encoded data of a moving image from the multiplexed data. In the following, a process of separating encoded data from multiplexed data is called inverse multiplexing.

When a decoding process is parallelized, the receiving apparatus needs to allocate decoding target encoded data to each decoding device. At this time, the receiving apparatus needs to analyze the encoded data itself. In 8K content and the like, particularly, bit rate is very high and thus processing load for the analysis is high. By this, an inverse multiplexing process may become a bottleneck and accordingly real-time playback may not be able to be performed.

(Underlying Knowledge Forming Basis of the Present Disclosure)

In recent years, there has been an increase in the resolution of displays such as TVs, smartphones, or tablet terminals. In particular, in broadcasting in Japan, 8K4K (8K×4K resolution) service is scheduled for 2020. Since it is difficult for a single decoding device to decode a moving image with ultra-high resolution such as 8K4K in real time, there is considered a technique for performing decoding processes in parallel using a plurality of decoding devices.

In moving image coding methods such as H.264 and H.265 which are standardized by MPEG (Moving Picture Experts Group) and ITU (International Telecommunication Union), a transmitting apparatus can divide a picture into a plurality of regions called slices or slice segments, and encode the divided regions such that the divided regions can be decoded independently of each other. Therefore, for example, in a case of H.265, a receiving apparatus that receives a broadcast separates pieces of data for the respective slice segments from received data, and outputs the pieces of slice segment data to different decoding devices, by which parallelization of a decoding process can be implemented.

Figure 1:
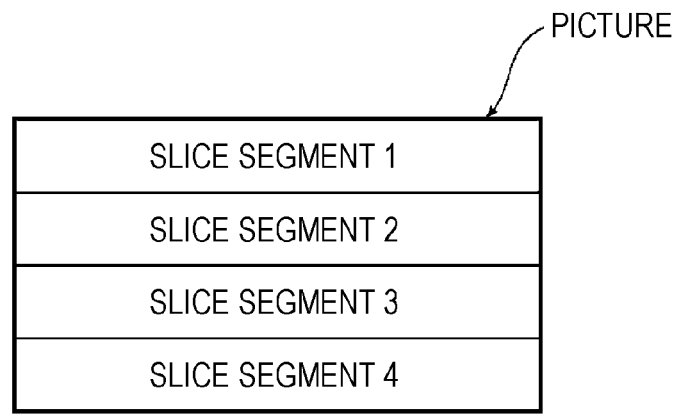
FIG. 1 is a diagram showing an example in which a picture is divided into slice segments.

FIG. 1 is a diagram showing an example in which one picture is divided into four slice segments in HEVC (High Efficiency Video Coding). For example, a receiving apparatus includes four decoding devices, and each decoding device decodes any one of the four slice segments.

In conventional broadcasting, a transmitting apparatus stores one picture (an access unit in an MPEG system standard) in one PES packet, and multiplexes the PES packet into a TS packet sequence. Hence, the receiving apparatus needs to separate a payload of the PES packet and then analyze access unit data stored in the payload, to separate each slice segment, and output pieces of data of the separated slice segments to the decoding devices.

However, the present inventors have found that, since workload for when access unit data is analyzed to separate slice segments is high, it is difficult to perform this process in real time.

Figure 2:
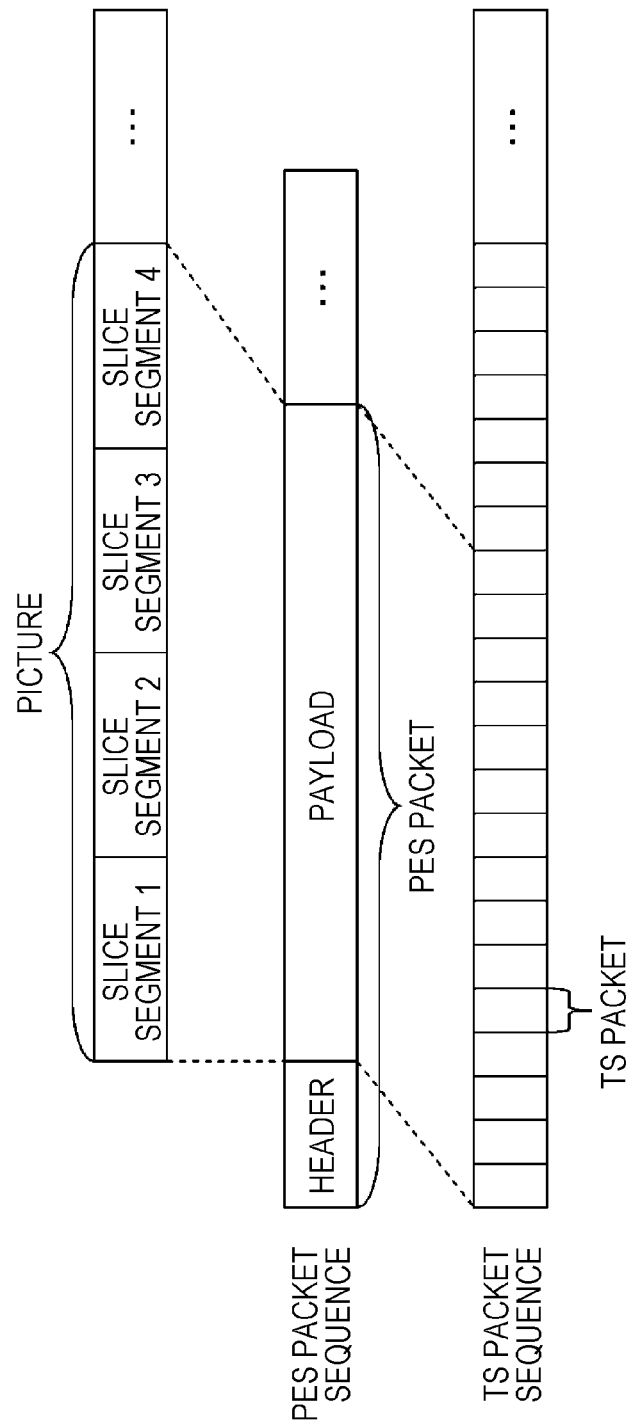
FIG. 2 is a diagram showing an example of a PES packet sequence where picture data is stored.

FIG. 2 is a diagram showing an example in which pieces of data of a picture divided into slice segments are stored in a payload of a PES packet.

As shown in FIG. 2, for example, pieces of data of a plurality of slice segments (slice segments 1 to 4) are stored in a payload of one PES packet. In addition, the PES packet is multiplexed into a TS packet sequence.

A transmission method according to one aspect of the present disclosure includes: dividing a picture into a plurality of regions; generating a plurality of pieces of encoded data that respectively correspond to the plurality of regions by encoding the plurality of regions such that each of the plurality of regions can be decoded independently; packetizing the generated plurality of pieces of encoded data into a plurality of packets; and a transmitting step of transmitting the plurality of packets such that pieces of encoded data for different regions are not stored in a single packet.

According to this, pieces of encoded data of the respective regions are stored in different packets. Thus, without analyzing encoded data stored in a payload of a packet, a receiving apparatus can determine which region's encoded data the data stored in the packet is. By this, the receiving apparatus can perform a process of generating decoding target data for each decoder, with a low workload. As such, workload for generation of decoding target data in the receiving apparatus is reduced.

For example, in the packetization, control information is stored in a packet different from the plurality of packets where the plurality of pieces of encoded data are stored, the control information being commonly used for all decoding units in the picture.

According to this, the receiving apparatus can determine a packet that stores control information, without analyzing encoded data stored in a payload of a packet. By this, workload for generation of decoding target data in the receiving apparatus can be reduced.

In addition, a reception method according to one aspect of the present disclosure is a reception method for a receiving apparatus including a plurality of decoders. The reception method includes: receiving a plurality of packets, the plurality of packets being obtained by packetizing a plurality of pieces of encoded data, the plurality of pieces of encoded data being obtained by encoding a plurality of regions of a picture such that the plurality of regions can be decoded independently, the plurality of regions being obtained by dividing the picture, and the packetization being performed such that pieces of encoded data of different regions are not stored in a single packet; combining control information and each of the plurality of pieces of encoded data of the plurality of regions, to generate a plurality of pieces of combined data, the control information being commonly used for all decoding units in the picture and being included in any of the plurality of packets; and decoding the plurality of pieces of combined data in parallel by using the plurality of decoders.

According to this, pieces of encoded data of the respective regions are stored in different packets. Thus, without analyzing encoded data stored in a payload of a packet, the receiving apparatus can determine which region's encoded data the data stored in the packet is. By this, the receiving apparatus can perform a process of generating decoding target data for each decoder, with a low workload. As such, workload for generation of decoding target data in the receiving apparatus is reduced.

For example, the control information is stored in a packet different from the plurality of packets that store the plurality of pieces of encoded data.

According to this, the receiving apparatus can determine a packet that stores control information, without analyzing encoded data stored in a payload of a packet. By this, workload for generation of decoding target data in the receiving apparatus can be reduced.

For example, in the combining, it is determined, using header information of a packet, which one of the plurality of pieces of encoded data of the regions a piece of data stored in the packet is.

According to this, the receiving apparatus can determine, using header information of a packet, which region's encoded data a piece of data stored in the packet is.

For example, each of the plurality of pieces of encoded data has a one-to-one correspondence with a basic data unit, the basic data unit being a unit of data stored in one or more packets. Each of the plurality of pieces of encoded data is stored in the one or more packets. Header information of each of the packets includes identification information indicating any one of: (1) only the packet is included in the basic data unit; (2) a plurality of packets are included in the basic data unit, and the packet is a first packet of the basic data unit; (3) a plurality of packets are included in the basic data unit, and the packet is a packet other than the first packet and a last packet of the basic data unit; and (4) a plurality of packets are included in the basic data unit, and the packet is the last packet of the basic data unit. In the coupling step, it is determined that a start of payload data included in a packet having the header information including the identification information indicating that (1) only the packet is included in the basic data unit or (2) a plurality of packets are included in the basic data unit, and the packet is a first packet of the basic data unit, is a start of the piece of encoded data of each of the regions.

According to this, the receiving apparatus can determine, using header information of a packet, which region's encoded data a piece of data stored in the packet is.

For example, the header information of the packet further includes offset information indicating a bit length from a start of encoded data of the picture including the plurality of pieces of encoded data to a start of a piece of encoded data included in the packet. In the coupling step, it is determined that a start of payload data included in a packet having the header information including: the identification information indicating that (1) only the packet is included in the basic data unit or (2) a plurality of packets are included in the basic data unit, and the packet is a first packet of the basic data unit; and the offset information indicating a bit length of not zero, is a start of the piece of encoded data of each of the regions.

According to this, the receiving apparatus can determine, using header information of a packet, which region's encoded data a piece of data stored in the packet is.

For example, the reception method further includes determining one of the plurality of decoders to be used to decode the plurality of pieces of combined data, respectively, based on at least one of resolution of the picture, a method for dividing the picture into the plurality of regions, and processing capabilities of the plurality of decoders.

According to this, the receiving apparatus can appropriately assign pieces of encoded data of the respective regions to the plurality of decoders.

In addition, a transmitting apparatus according to one aspect of the present disclosure includes: a divider that divides a picture into a plurality of regions; an encoder that generates a plurality of pieces of encoded data that respectively correspond to the plurality of regions by encoding the plurality of regions such that each of the plurality of regions can be decoded independently; a packetizer that stores the generated plurality of pieces of encoded data in a plurality of packets; and a transmitter that transmits the plurality of packets such that pieces of encoded data for different regions are not stored in one packet. The packetizer stores the generated plurality of pieces of encoded data in the plurality of packets such that pieces of encoded data for different regions are not stored in a single packet.

According to this, pieces of encoded data of the respective regions are stored in different packets. Thus, without analyzing encoded data stored in a payload of a packet, a receiving apparatus can determine which region's encoded data the data stored in the packet is. By this, the receiving apparatus can perform a process of generating decoding target data for each decoder, with a low workload. As such, workload for generation of decoding target data in the receiving apparatus is reduced.

In addition, a receiving apparatus according to one aspect of the present disclosure includes: a receiver that receives a plurality of packets, the plurality of packets being obtained by packetizing a plurality of pieces of encoded data, the plurality of pieces of encoded data being obtained by encoding a plurality of regions of a picture such that the plurality of regions can be decoded independently, the plurality of regions being obtained by dividing the picture, and the packetization being performed such that pieces of encoded data for different regions are not stored in a single packet; a combiner that combines control information and each of the plurality of pieces of encoded data of the plurality of regions, to generate a plurality of pieces of combined data, the control information being commonly used for all decoding units in the picture and being included in any of the plurality of packets; and a plurality of decoders that decode the plurality of pieces of combined data in parallel.

According to this, pieces of encoded data of the respective regions are stored in different packets. Thus, without analyzing encoded data stored in a payload of a packet, the receiving apparatus can determine which region's encoded data the data stored in the packet is. By this, the receiving apparatus can perform a process of generating decoding target data for each decoder, with a low workload. As such, workload for generation of decoding target data in the receiving apparatus is reduced.

Note that these comprehensive or specific aspects may be implemented by a system, a method, an integrated circuit, a computer program, or a recording medium such as a computer-readable CD-ROM, or may be implemented by any combination of a system, a method, an integrated circuit, a computer program, and a recording medium.

An exemplary embodiment will be specifically described below with reference to the drawings.

Note that each of exemplary embodiments which will be described below shows one specific example of the present disclosure. Numerical values, shapes, materials, components, disposition positions and connection modes of the components, steps, order of the steps, and the like, which are shown in the following exemplary embodiment are examples and thus are not intended to limit the present disclosure. Note also that, of the components of the following exemplary embodiment, components that are not described in independent claims representing the broadest concept are described as arbitrary components.

(Exemplary Embodiment)

Although the following describes, as an example, a case of using H.265 as a moving image coding method, the present exemplary embodiment can also be applied to a case of using other coding methods such as H.264.

Figure 3:
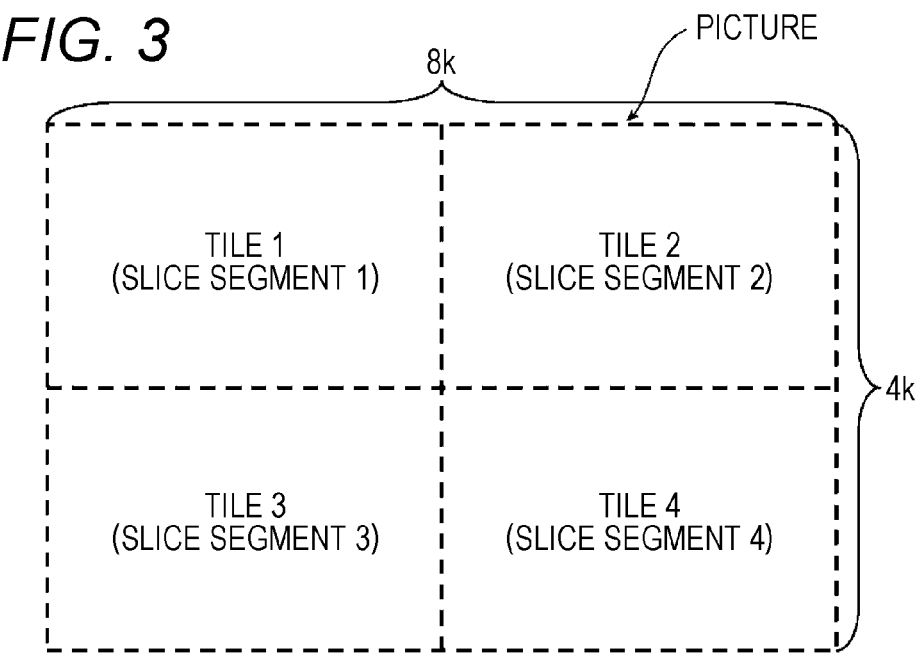
FIG. 3 is a diagram showing exemplary division of a picture according to an exemplary embodiment.

FIG. 3 is a diagram showing an example in which an access unit (picture) of the present exemplary embodiment is divided into division units. The access unit is divided into two equal parts in horizontal and vertical directions, respectively, by a function called tiles which is introduced by H.265, resulting in being divided into a total of four tiles. In addition, the slice segments and the tiles have a one-to-one correspondence.

Reasons that the access unit is thus divided into two equal parts in the horizontal and vertical directions will be described. First, upon decoding, generally, a line memory that stores data of one horizontal line is required. In a case of ultra-high resolution such as 8K4K, due to an increase in size in the horizontal direction, a size of the line memory increases. In implementation of a receiving apparatus, it is desirable to be able to reduce the size of the line memory. To reduce the size of the line memory, division in the vertical direction is required. The division in the vertical direction requires a data structure called tiles. Due to these reasons, the tiles are used.

On the other hand, since an image generally has a high correlation in the horizontal direction, encoding efficiency improves when a range that is wider in the horizontal direction can be referred to. Therefore, in terms of encoding efficiency, it is desirable that the access unit be divided in the horizontal direction.

By the access unit divided into equal two parts in the horizontal and vertical directions, these two characteristics are made compatible and thus both aspects, an aspect of implementation and encoding efficiency, can be taken into account. When a single decoding device can decode a 4K2K moving image in real time, an 8K4K image is divided into four equal parts, by which the image is divided such that each slice segment is 4K2K. By this, the receiving apparatus can decode the 8K4K image in real time.

Next, a reason that the tiles obtained by dividing the access unit in the horizontal and vertical directions and the slice segments are allowed to have a one-to-one correspondence will be described. In H.265, an access unit is composed of a plurality of units called NAL (Network Adaptation Layer) units.

A payload of each NAL unit stores any of, for example, an access unit delimiter indicating a start position of the access unit, SPS (Sequence Parameter Set) which is initialization information for decoding to be shared on a per sequence basis, PPS (Picture Parameter Set) which is initialization information for decoding to be shared in the picture, SEI (Supplemental Enhancement Information) which is not required for a decoding process itself but is required for a process and display of decoding results, etc., and encoded data of a slice segment. A header of the NAL unit includes type information for identifying data stored in the payload.

Here, when the transmitting apparatus multiplexes encoded data in a multiplexing format such as MPEG-2 TS, MMT (MPEG Media Transport), MPEG DASH (Dynamic Adaptive Streaming over HTTP), or RTP (Real-time Transport Protocol), the transmitting apparatus can set a NAL unit as a basic unit. To store one slice segment in one NAL unit, it is desirable that, when an access unit is divided into regions, the access unit be divided into slice segment units. For such a reason, the transmitting apparatus allows the tiles and the slice segments to have a one-to-one correspondence.

Figure 4:
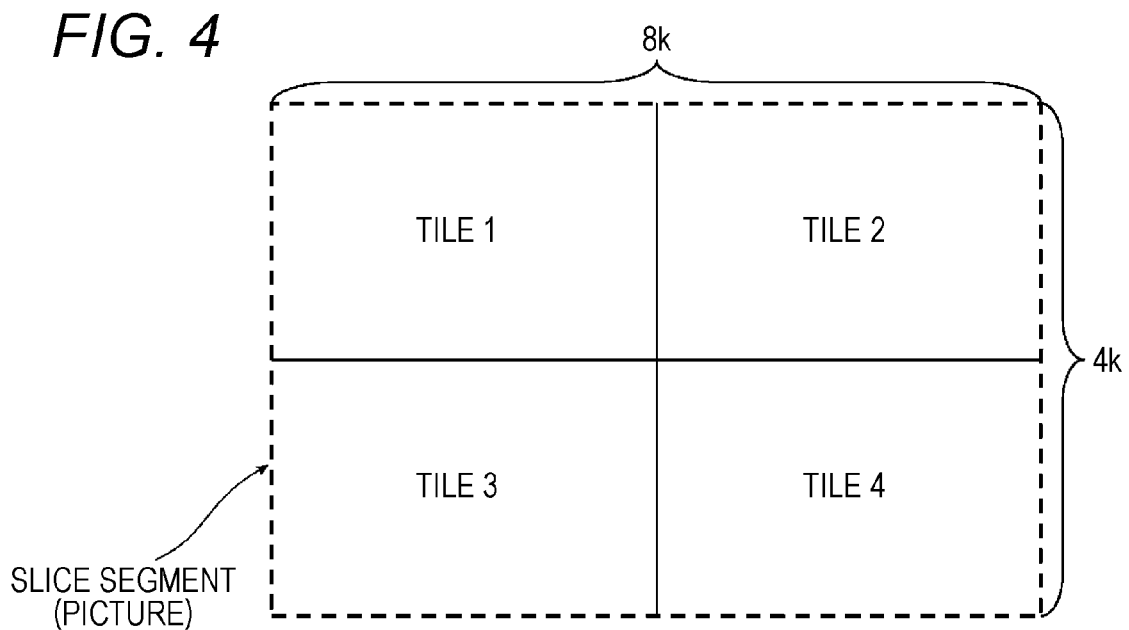
FIG. 4 is a diagram showing exemplary division of a picture according to a comparative example of the exemplary embodiment.

Note that, as shown in FIG. 4, the transmitting apparatus can also collectively set tile 1 to tile 4 as one slice segment. However, in this case, all tiles are to be stored in one NAL unit, and thus, it is difficult for the receiving apparatus to separate the tiles in a multiplexed layer.

Note that slice segments include an independent slice segment that can be decoded independently; and a reference slice segment that refers to the independent slice segment. Here, a case of using the independent slice segment is described.

Figure 5:
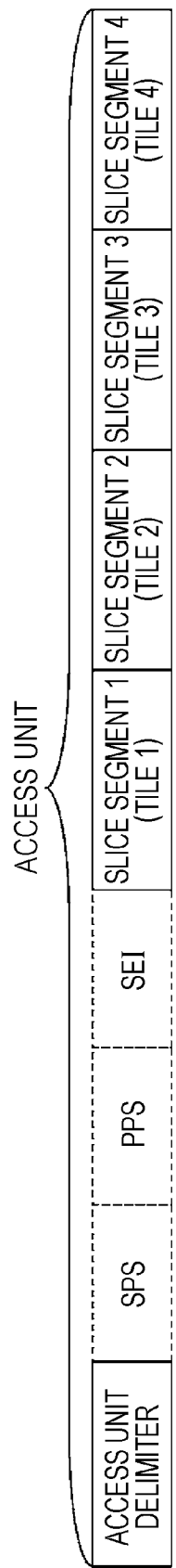
FIG. 5 is a diagram showing an example of access unit data according to the exemplary embodiment.

FIG. 5 is a diagram showing an example of data of an access unit divided such that boundaries between tiles and slice segments match each other as shown in FIG. 3. The access unit data includes a NAL unit that is disposed first and that stores an access unit delimiter; NAL units of SPS, PPS, and SEI that are disposed after the NAL unit; and pieces of slice segment data that are disposed after the NAL units and that store pieces of data of tile 1 to tile 4. Note that the access unit data does not need to include some or all of the NAL units of SPS, PPS, and SEI.

Figure 6:
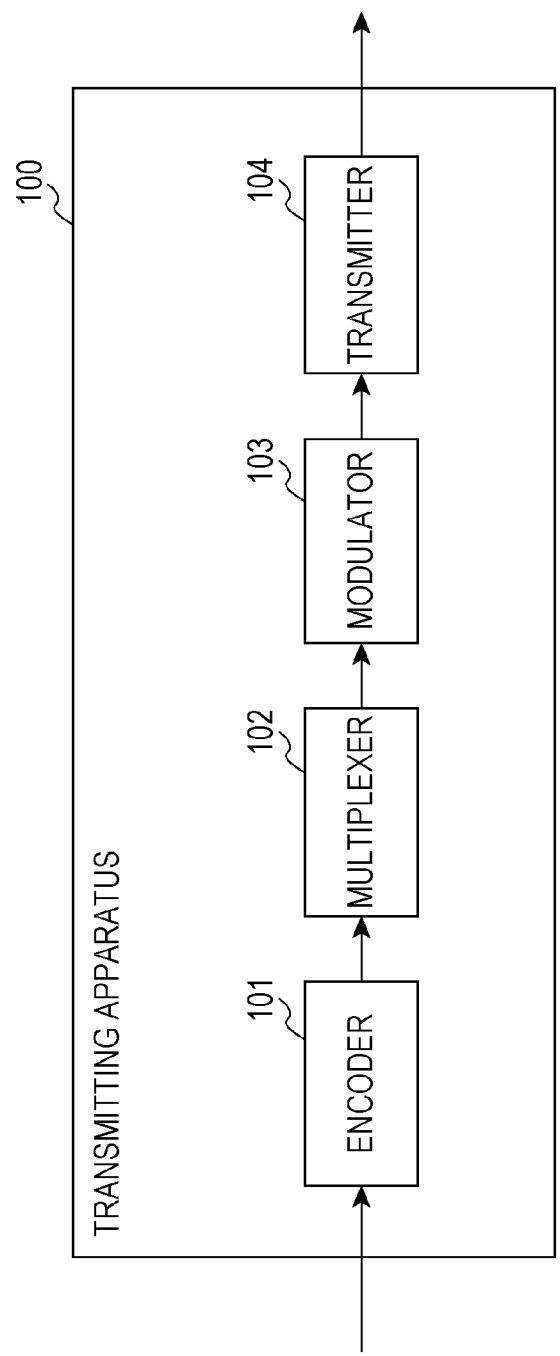
FIG. 6 is a block diagram of a transmitting apparatus according to the exemplary embodiment.

Next, a configuration of transmitting apparatus 100 according to the present exemplary embodiment will be described. FIG. 6 is a block diagram showing an exemplary configuration of transmitting apparatus 100 according to the present exemplary embodiment. This transmitting apparatus 100 includes encoder 101, multiplexer 102, modulator 103, and transmitter 104.

Encoder 101 encodes an input image according to, for example, H.265 and thereby generates encoded data. In addition, encoder 101 divides an access unit into four slice segments (tiles) as shown in FIG. 3, for example, and encodes each slice segment.

Multiplexer 102 multiplexes the encoded data generated by encoder 101. Modulator 103 modulates the data obtained by the multiplexing. Transmitter 104 transmits the modulated data as a broadcast signal.

Figure 7:
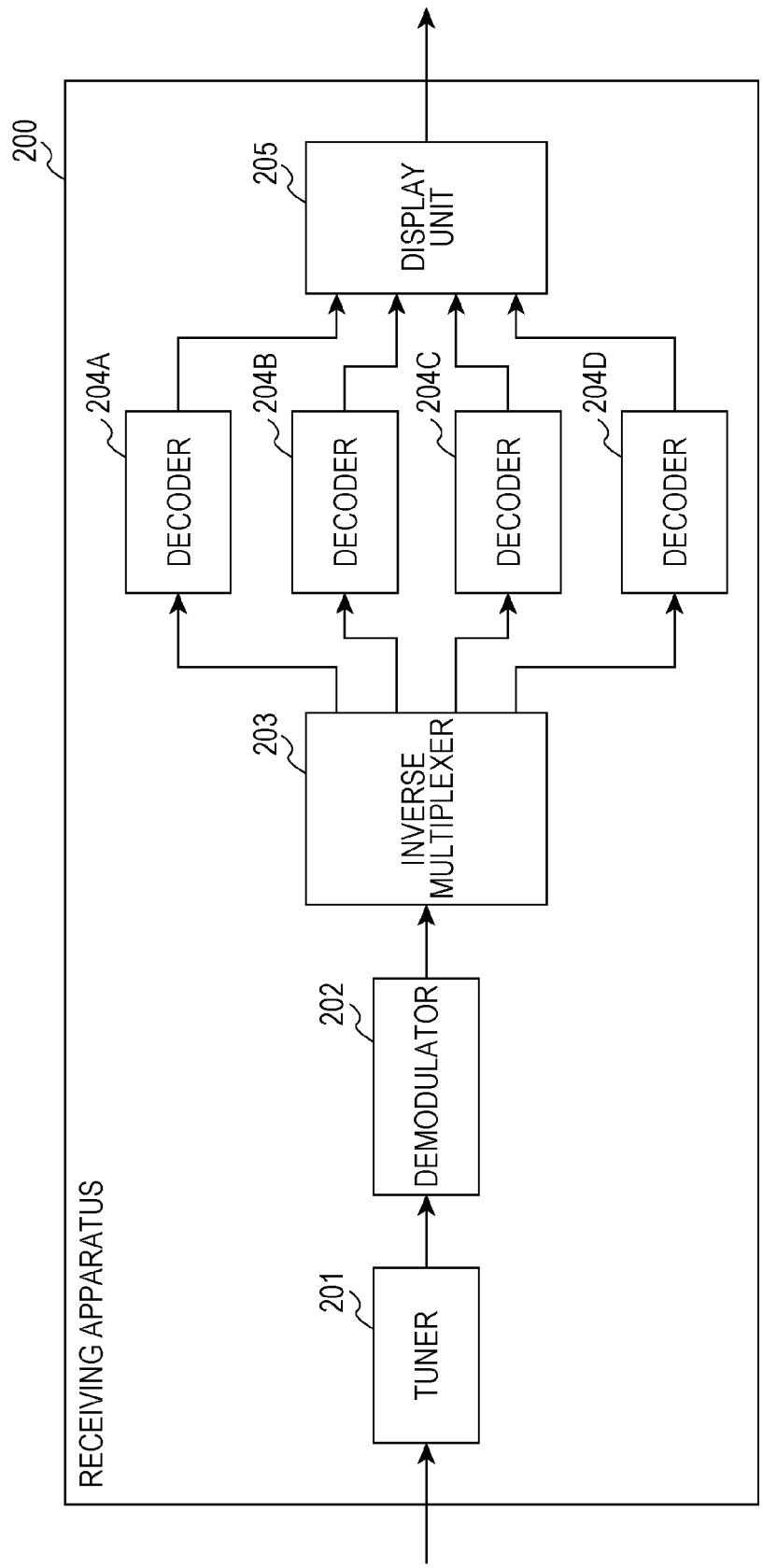
FIG. 7 is a block diagram of a receiving apparatus according to the exemplary embodiment.

Next, a configuration of receiving apparatus 200 according to the present exemplary embodiment will be described. FIG. 7 is a block diagram showing an exemplary configuration of receiving apparatus 200 according to the present exemplary embodiment. This receiving apparatus 200 includes tuner 201, demodulator 202, inverse multiplexer 203, a plurality of decoders 204A to 204D, and display unit 205.

Tuner 201 receives a broadcast signal. Demodulator 202 demodulates the received broadcast signal. Demodulated data is input to inverse multiplexer 203.

Inverse multiplexer 203 separates the demodulated data into division units, and outputs the pieces of data for the respective division units to decoders 204A to 204D. Here, the division units are divided regions obtained by dividing an access unit, and are, for example, slice segments in H.265. In addition, here, an 8K4K image is divided into four 4K2K images. Thus, there are four decoders 204A to 204D.

A plurality of decoders 204A to 204D operate in synchronization with each other based on a predetermined reference clock. Each decoder decodes encoded data of a division unit according to a DTS (Decoding Time Stamp) of the access unit, and outputs a decoding result to display unit 205.

Display unit 205 integrates the plurality of decoding results which are output from a plurality of decoders 204A to 204D, and thereby creates an 8K4K output image. Display unit 205 displays the created output image according to a PTS (Presentation Time Stamp) of the access unit which is obtained separately. Note that, when the decoding results are integrated, display unit 205 may perform a filtering process, such as a deblocking filter, on boundary regions between adjacent division units such as boundaries between tiles, so as to prevent the boundaries from becoming visually noticeable.

Note that although the above describes, as an example, transmitting apparatus 100 and receiving apparatus 200 that perform transmission or reception of a broadcast, content may be transmitted and received via a communication network. When receiving apparatus 200 receives content via a communication network, receiving apparatus 200 separates multiplexed data from an IP packet which is received through a network such as Ethernet.

In broadcasting, a transmission channel delay from when a broadcast signal is transmitted to when the broadcast signal reaches receiving apparatus 200 is constant. On the other hand, in a communication network such as the Internet, due to an influence of congestion, a transmission channel delay for data transmitted from a server to reach receiving apparatus 200 is not constant. Therefore, in many cases, receiving apparatus 200 does not perform strict synchronous playback based on a reference clock such as PCR in MPEG-2 TS in broadcasting. Hence, receiving apparatus 200 may display an 8K4K output image on display unit 205 according to PTS, without the decoders strictly synchronized with each other.

In addition, there is a case in which due to congestion in a communication network, etc., decoding processes for all division units have not been completed at a time indicated by PTS of an access unit. In this case, receiving apparatus 200 skips display of the access unit, or delays display until decoding of at least four division units is finished and creation of an 8K4K image is completed.

Note that content may be transmitted and received by using both broadcasting and communication. Note also that this technique can also be applied when multiplexed data stored in a recording medium such as a hard disk or a memory is played back.

Next, a method for multiplexing an access unit divided into slice segments for a case of using MMT as a multiplexing method will be described.

Figure 8:
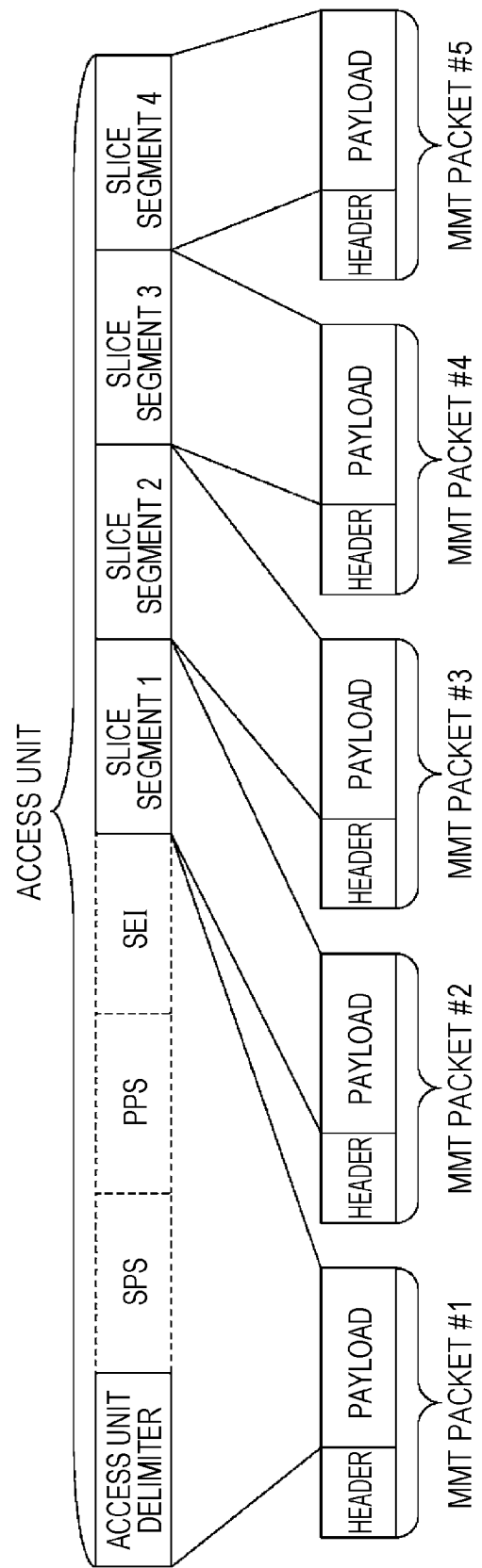
FIG. 8 is a diagram showing an example of MMT packets according to the exemplary embodiment.

FIG. 8 is a diagram showing an example of when HEVC access unit data is MMT-packetized. SPS, PPS, SEI, and the like, do not necessarily need to be included in an access unit, but here a case in which SPS, PPS, SEI, and the like, are present is exemplified.

NAL units that are disposed before a first slice segment in the access unit, such as an access unit delimiter, SPS, PPS, and SEI, are collectively stored in MMT packet #1. Subsequent slice segments are stored in different MMT packets for different slice segments.

Figure 9:
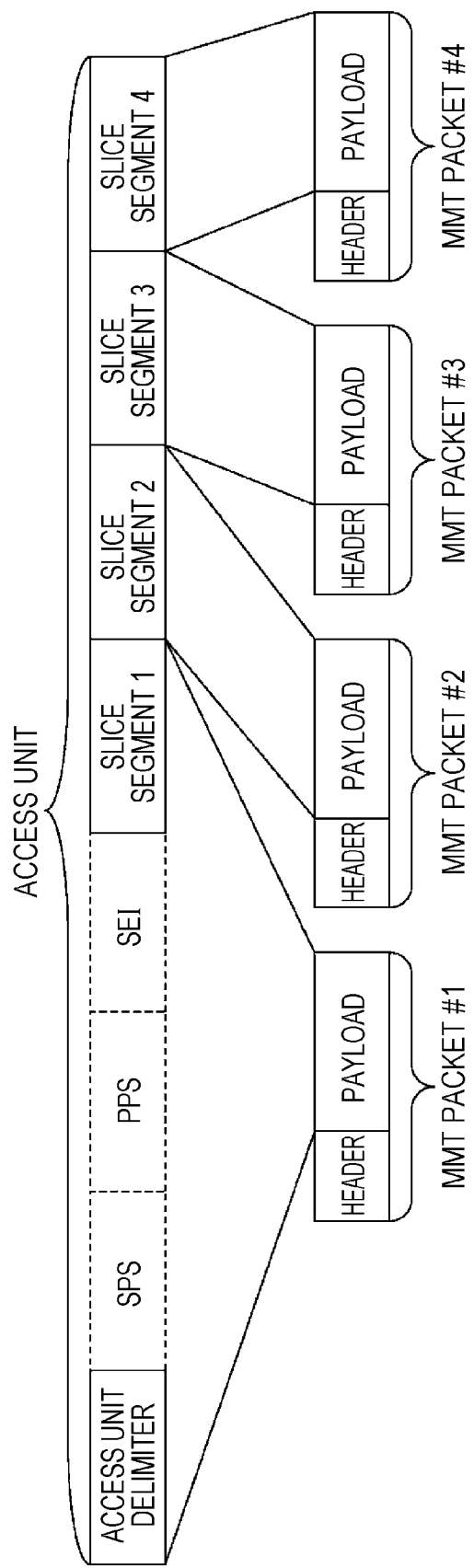
FIG. 9 is a diagram showing another example of MMT packets according to the exemplary embodiment.

Note that, as shown in FIG. 9, NAL units that are disposed before a first slice segment in an access unit may be stored in the same MMT packet as the first slice segment.

In addition, when a NAL unit that indicates an end of a sequence or stream, such as End-of-Sequence or End-of-Bitstream, is added after a last slice segment, they are stored in the same MMT packet as the last slice segment. Note, however, that since a NAL unit such as End-of-Sequence or End-of-Bitstream is inserted, for example, in an end point of a decoding process or a connecting point between two streams, it may be desirable for receiving apparatus 200 to be able to easily obtain these NAL units in a multiplexed layer. In this case, these NAL units may be stored in a different MMT packet than a slice segment. By this, receiving apparatus 200 can easily separate these NAL units in the multiplexed layer.

Note that, as a multiplexing method, TS, DASH, RTP, or the like, may be used. In these methods, too, transmitting apparatus 100 stores different slice segments in different packets. This can guarantee that receiving apparatus 200 can separate slice segments in a multiplexed layer.

For example, in a case of using TS, encoded data is PES-packetized in slice segment units. In a case of using RTP, encoded data is RTP-packetized in slice segment units. In these cases, too, like MMT packet #1 shown in FIG. 8, NAL units that are disposed before slice segments and the slice segments may be separately packetized.

In a case of using TS, transmitting apparatus 100 indicates a unit of data to be stored in a PES packet, for example, by using a data alignment descriptor. In addition, since DASH is a method in which MP4 format data units called segments are downloaded by HTTP, etc., transmitting apparatus 100 does not packetize encoded data upon transmission. Hence, transmitting apparatus 100 may create subsamples in slice segment units and store, in a header of MP4, information indicating subsample storage locations, so that receiving apparatus 200 can detect slice segments in a multiplexed layer in MP4.

MMT packetization of slice segments will be described in detail below.

By encoded data packetized as shown in FIG. 8, pieces of data to be referred to in a shared manner upon decoding of all slice segments in an access unit, such as SPS and PPS, are stored in MMT packet #1. In this case, receiving apparatus 200 combines payload data of MMT packet #1 and data of each slice segment together, and outputs the pieces of obtained data to the decoders 204A to 204D. As such, receiving apparatus 200 can easily generate input data to the decoders 204A to 204D by combining payloads of a plurality of MMT packets together.

Figure 10:
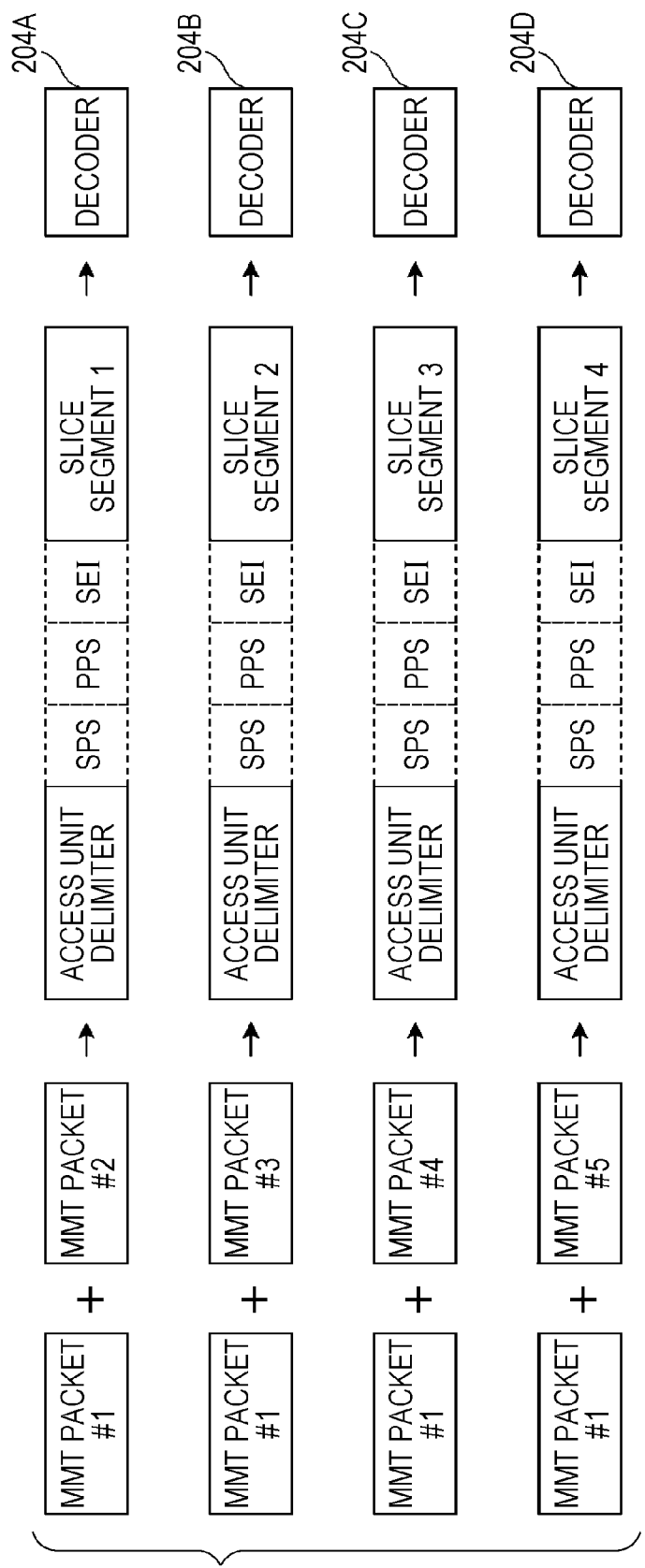
FIG. 10 is a diagram showing an example of data to be input to each decoder according to the exemplary embodiment.

FIG. 10 is a diagram showing an example in which pieces of input data to decoders 204A to 204D are generated from MMT packets shown in FIG. 8. Inverse multiplexer 203 combines pieces of payload data of MMT packet #1 and MMT packet #2 together, and thereby generates data that is required for decoder 204A to decode slice segment 1. For decoders 204B to 204D, too, inverse multiplexer 203 generates input data in the same manner. Specifically, inverse multiplexer 203 combines pieces of payload data of MMT packet #1 and MMT packet #3 together, and thereby generates input data to decoder 204B. Inverse multiplexer 203 combines pieces of payload data of MMT packet #1 and MMT packet #4 together, and thereby generates input data to decoder 204C. Inverse multiplexer 203 combines pieces of payload data of MMT packet #1 and MMT packet #5 together, and thereby generates input data to decoder 204D.

Note that inverse multiplexer 203 may remove NAL units that are not required for a decoding process such as an access unit delimiter and SEI from the payload data of MMT packet #1, to separate only NAL units of SPS and PPS that are required for the decoding process, and add the separated NAL units to slice segment data.

When encoded data is packetized as shown in FIG. 9, inverse multiplexer 203 outputs MMT packet #1 including first data of an access unit in a multiplexed layer, to first decoder 204A. In addition, inverse multiplexer 203 analyzes the MMT packet including the first data of the access unit in the multiplexed layer, to separate NAL units of SPS and PPS, and adds the separated NAL units of SPS and PPS to each of pieces of second and subsequent slice segment data, and thereby generates pieces of input data to respective second and subsequent decoders.

Furthermore, it is desirable that receiving apparatus 200 be able to identify, using information included in a header of an MMT packet, a type of data stored in an MMT payload, and an index number of a slice segment in an access unit for when the slice segment is stored in the payload. The type of data as used herein is either data before the slice segment (those NAL units that are disposed before a first slice segment in the access unit are collectively called such) or slice segment data. When a unit into which an MPU (Media Processing Unit) is fragmented such as a slice segment is stored in an MMT packet, a mode for storing an MFU (Media Fragment Unit) is used. When transmitting apparatus 100 uses this mode, transmitting apparatus 100 can set, for example, a sample (which is a data unit in MMT and corresponds to an access unit) or a subsample (a unit obtained by dividing the sample), as a Data unit which is a basic unit of data in the MFU.

At this time, a header of an MMT packet includes a field called a fragmentation indicator and a field called a fragment counter.

The fragmentation indicator indicates whether data stored in a payload of the MMT packet is data obtained by fragmenting a Data unit, and indicates, when the Data unit is fragmented, whether the fragment is a first or last fragment of the Data unit or a fragment that is neither the first one nor the last one. In other words, a fragmentation indicator included in a header of a given packet is identification information indicating any one of: (1) only the packet is included in a Data unit which is a basic data unit; (2) the Data unit is divided into a plurality of packets and stored, and the packet is a first packet of the Data unit; (3) the Data unit is divided into a plurality of packets and stored, and the packet is a packet other than the first and last packets of the Data unit; and (4) the Data unit is divided into a plurality of packets and stored, and the packet is the last packet of the Data unit.

The fragment counter is an index number indicating which position's fragment in the Data unit the data stored in the MMT packet corresponds to.

Therefore, by transmitting apparatus 100 setting a sample in MMT as a Data unit and setting each of data before the slice segment and slice segments as a fragment unit of the Data unit, receiving apparatus 200 can identify a type of data stored in a payload, using information included in a header of an MMT packet. That is, inverse multiplexer 203 can generate input data to each of decoders 204A to 204D by referring to a header of an MMT packet.

Figure 11:
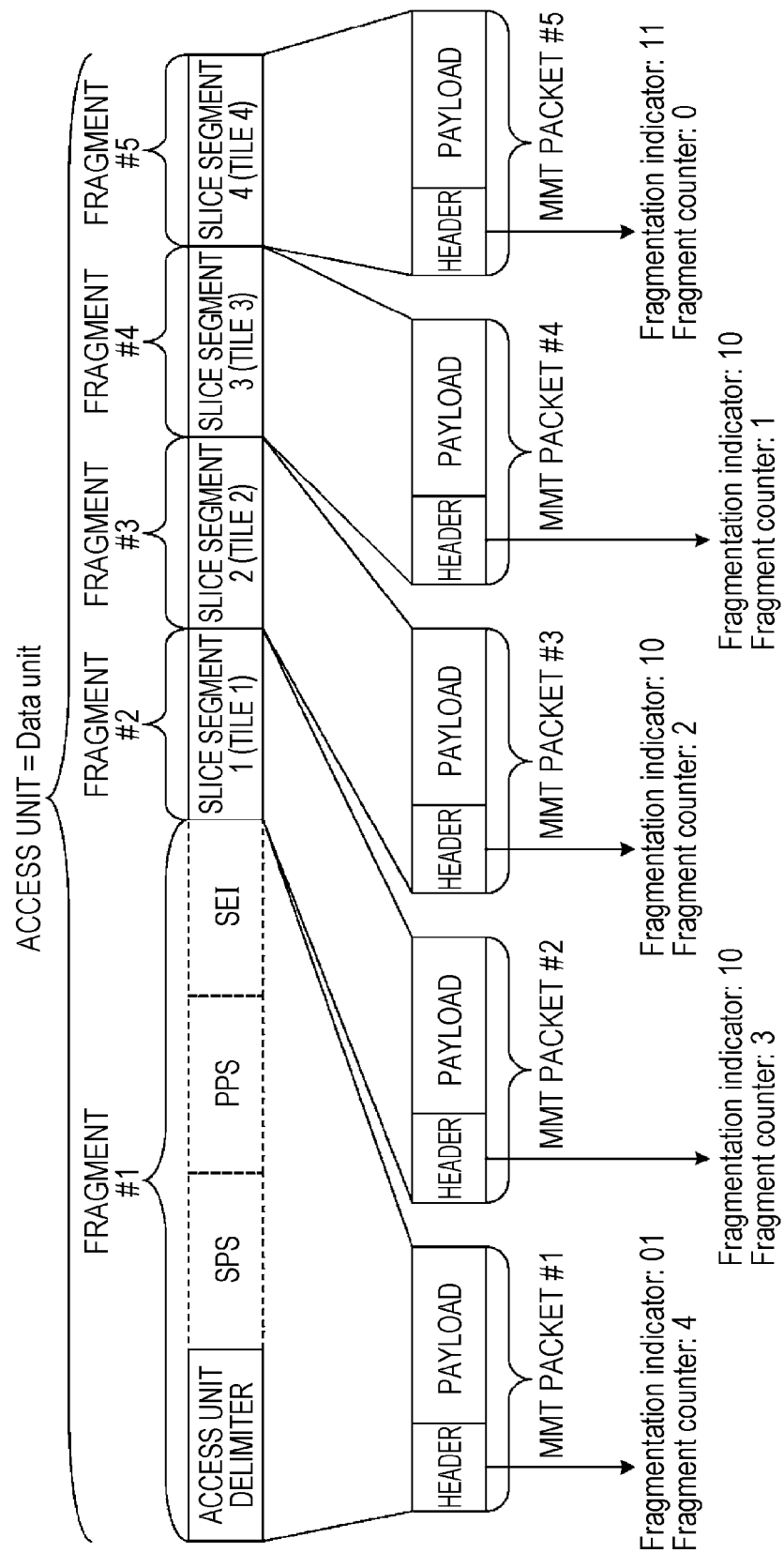
FIG. 11 is a diagram showing an example of MMT packets and header information according to the exemplary embodiment.

FIG. 11 is a diagram showing an example of a case in which a sample is set as a Data unit, and data before the slice segment and slice segments are packetized as fragments of the Data unit.

Data before the slice segment and slice segments are divided into five fragments from fragment #1 to fragment #5. The fragments are stored in individual MMT packets. At this time, values of fragmentation indicators and fragment counters included in headers of the MMT packets are as shown in the drawing.

For example, the fragmentation indicator is a 2-bit binary value. Different values are set for the fragmentation indicator of MMT packet #1 which is a first one of the Data unit, the fragmentation indicator of MMT packet #5 which is a last one, and the fragmentation indicators of MMT packet #2 to MMT packet #4 which are packets between the first and last ones. Specifically, the fragmentation indicator of MMT packet #1 which is the first one of the Data unit is set to 01, the fragmentation indicator of MMT packet #5 which is the last one is set to 11, and the fragmentation indicators of MMT packet #2 to MMT packet #4 which are packets between the first and last ones are set to 10. Note that, when the Data unit includes only one MMT packet, the fragmentation indicator is set to 00.

In addition, the fragment counter of MMT packet #1 is 4 which is a value obtained by subtracting 1 from 5 which is a total number of the fragments. For the fragment counters of subsequent packets, the value is decreased by 1 in turn. The fragment counter of last MMT packet #5 is 0.

Therefore, receiving apparatus 200 can identify an MMT packet that stores data before the slice segment, using either one of the fragmentation indicator and the fragment counter. In addition, receiving apparatus 200 can identify an MMT packet that stores an Nth slice segment, by referring to the fragment counter.

The header of the MMT packet separately includes a sequence number, in an MPU, of a movie fragment to which the Data unit belongs, a sequence number of the MPU itself, and a sequence number, in the movie fragment, of a sample to which the Data unit belongs. Inverse multiplexer 203 can uniquely determine a sample to which the Data unit belongs, by referring to those sequence numbers.

Furthermore, since inverse multiplexer 203 can determine an index number of a fragment in the Data unit from the fragment counter, etc., even when packet loss occurs, inverse multiplexer 203 can uniquely identify a slice segment stored in the fragment. For example, even if inverse multiplexer 203 cannot obtain fragment #4 shown in FIG. 11 due to packet loss, since inverse multiplexer 203 can know that a fragment received after fragment #3 is fragment #5, inverse multiplexer 203 can properly output slice segment 4 stored in fragment #5 to decoder 204D but not to decoder 204C.

Note that, when a transmission channel that guarantees non-occurrence of packet loss is used, inverse multiplexer 203 may periodically process a packet arrived, without determining a type of data stored in an MMT packet or an index number of a slice segment by referring to a header of the MMT packet. For example, when an access unit is transmitted by a total of five MMT packets, specifically, data before the slice segment and four slice segments, after receiving apparatus 200 determines the data before the slice of the access unit with which decoding starts, receiving apparatus 200 processes received MMT packets in turn. By this, receiving apparatus 200 can obtain the data before the slice segment and pieces of data of the four slice segments in turn.

Variants of packetization will be described below.

Slice segments do not necessarily need to be ones obtained by dividing an access unit plane in both the horizontal and vertical directions. Slice segments may be ones obtained by dividing an access unit only in the horizontal direction as shown in FIG. 1, or ones obtained by dividing an access unit only in the vertical direction.

In addition, when an access unit is divided only in the horizontal direction, there is no need to use tiles.

In addition, a number of divisions of an access unit plane is any and is not limited to four. Note, however, that region sizes of a slice segment and a tile need to be greater than or equal to a lower limit in a coding standard such as H.265.

Transmitting apparatus 100 may store identification information indicating a method for dividing an access unit plane, in an MMT message, a TS descriptor, or the like. For example, information indicating each of numbers of divisions of the plane in the horizontal direction and the vertical direction may be stored. Alternatively, unique identification information may be assigned to a division method, e.g., as shown in FIG. 3, the access unit is divided into two equal parts in the horizontal direction and the vertical direction, or as shown in FIG. 1, the access unit is divided into four equal parts in the horizontal direction. For example, when the access unit is divided in a manner shown in FIG. 3, the identification information indicates mode 2, and when the access unit is divided in a manner shown in FIG. 1, the identification information indicates mode 1.

In addition, information indicating constraints on encoding conditions related to a method for dividing a plane may be included in a multiplexed layer. For example, information indicating that one slice segment is composed of one tile may be used. Alternatively, information may be used indicating, for example, that a reference block used when motion compensation is performed upon decoding of a slice segment or a tile is limited to a slice segment or a tile present in the same location on a screen, or limited to blocks in a predetermined range in an adjacent slice segment.

In addition, transmitting apparatus 100 may switch, according to resolution of a moving image, whether to divide an access unit into a plurality of slice segments. For example, when a processing target moving image has 4K2K resolution, transmitting apparatus 100 may not divide a plane, and when a processing target moving image is resolution of 8K4K, transmitting apparatus 100 may divide an access unit into four parts. By defining in advance a division method for a case of an 8K4K moving image, receiving apparatus 200 can determine whether a plane is divided and determine a division method, by obtaining resolution of a received moving image, and switch decoding operation.

In addition, receiving apparatus 200 can detect whether a plane is divided, by referring to a header of an MMT packet. For example, when an access unit is not divided, if an MMT Data unit is set as a sample, the Data unit is not fragmented. Therefore, when a value of a fragment counter included in a header of an MMT packet is always zero, receiving apparatus 200 can determine that the access unit is not divided. Alternatively, receiving apparatus 200 may detect whether a value of a fragmentation indicator is always 01. When the value of the fragmentation indicator is always 01, too, receiving apparatus 200 can determine that the access unit is not divided.

In addition, receiving apparatus 200 can also handle a case in which a number of divisions of an access unit plane does not match a number of decoders. For example, when receiving apparatus 200 includes two decoders 204A and 204B that can decode 8K2K encoded data in real time, inverse multiplexer 203 outputs two of four slice segments composing 8K4K encoded data to decoder 204A.

Figure 12:
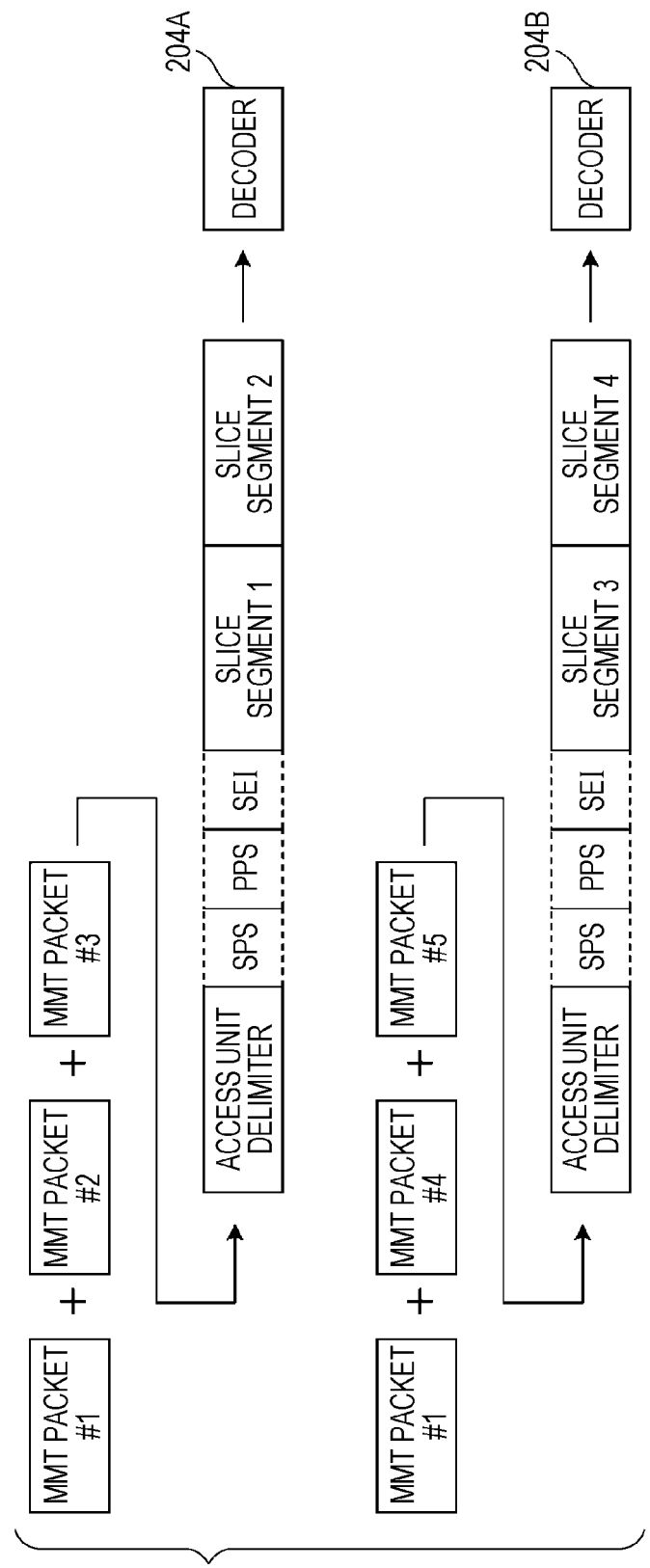
FIG. 12 is a diagram showing another example of data to be input to each decoder according to the exemplary embodiment.

FIG. 12 is a diagram showing exemplary operation performed when pieces of data which are MMT-packetized in a manner shown in FIG. 8 are input to two decoders 204A and 204B. Here, it is desirable that receiving apparatus 200 be able to integrate decoding results obtained by decoders 204A and 204B as they are, and output the integrated result. Thus, inverse multiplexer 203 selects slice segments to be output to decoders 204A and 204B, respectively, such that decoding results obtained by decoders 204A and 204B, respectively, are spatially consecutive.

In addition, inverse multiplexer 203 may select a decoder to use, according to resolution or frame rate of encoded data of a moving image. For example, when receiving apparatus 200 includes four 4K2K decoders, if resolution of an input image is 8K4K, then receiving apparatus 200 performs a decoding process using all of the four decoders. In addition, if resolution of an input image is 4K2K, then receiving apparatus 200 performs a decoding process using only one decoder. Alternatively, even if a plane is divided into four parts, when 8K4K can be decoded in real time by a single decoder, inverse multiplexer 203 integrates all division units and outputs the integrated unit to the one decoder.

Furthermore, receiving apparatus 200 may determine a decoder to use, taking into account frame rate. For example, there is a case in which encoded data with 8K4K and 120 fps is input when receiving apparatus 200 includes two decoders whose upper limit of frame rate at which real-time decoding can be performed when resolution is 8K4K is 60 fps. At this time, assuming that a plane is composed of four division units, as with the example of FIG. 12, slice segment 1 and slice segment 2 are input to decoder 204A, and slice segment 3 and slice segment 4 are input to decoder 204B. Since each of decoders 204A and 204B can perform real-time decoding up to 120 fps if resolution is 8K2K (resolution is half of 8K4K), a decoding process is performed by these two decoders 204A and 204B.

In addition, even with the same resolution and frame rate, when a profile or a level of a coding method or a coding method such as H.264 or H.265 itself is different, workload is different. Thus, receiving apparatus 200 may select a decoder to use, based on these pieces of information. Note that, when receiving apparatus 200 cannot decode all encoded data received through broadcasting or communication, or when receiving apparatus 200 cannot decode all slice segments or tiles that form a region selected by a user, receiving apparatus 200 may automatically determine slice segments or tiles that can be decoded within a processing range of the decoders. Alternatively, receiving apparatus 200 may provide a user interface used by the user to select a decoding region. At this time, receiving apparatus 200 may display a warning message indicating that a whole region cannot be decoded, or display information indicating a number of decodable regions, slice segments, or tiles.

In addition, the above-described method can also be applied to a case in which MMT packets that store slice segments of the same encoded data are transmitted and received using a plurality of transmission channels such as broadcasting and communication.

Figure 13:
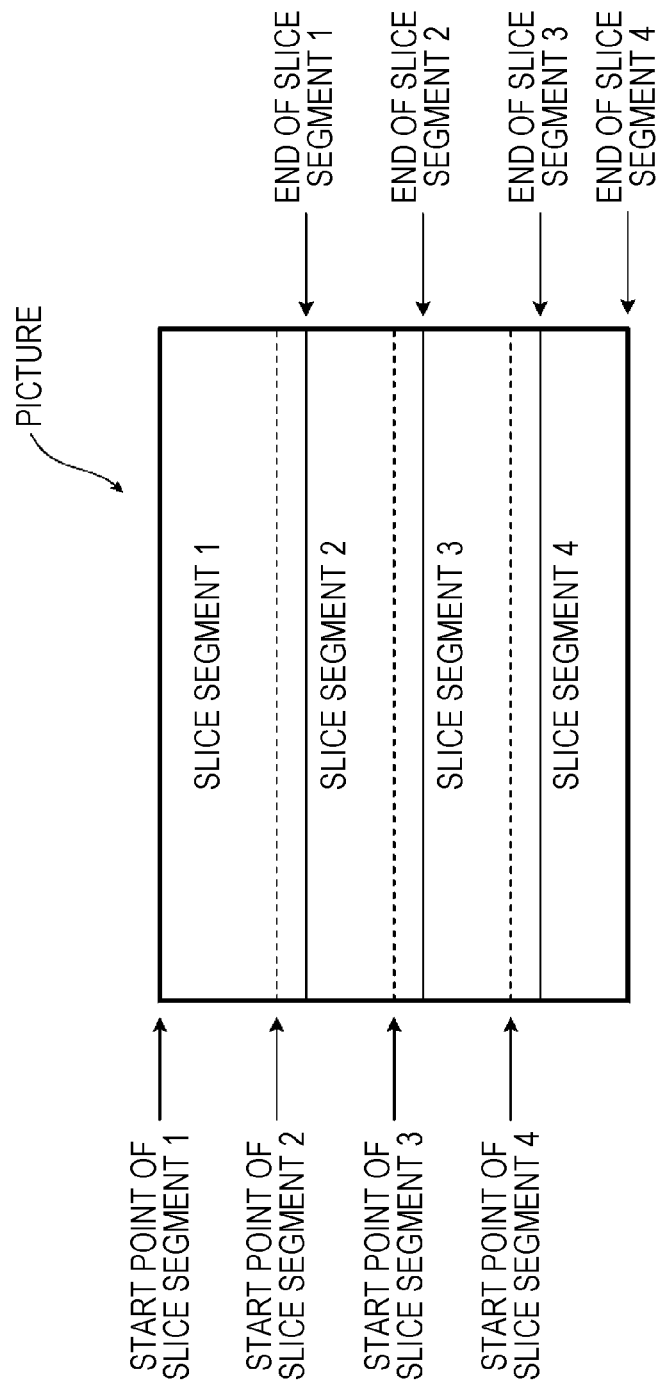
FIG. 13 is a diagram showing exemplary division of a picture according to the exemplary embodiment.

In addition, transmitting apparatus 100 may perform encoding such that slice segment regions overlap each other, so as to prevent boundaries between division units from becoming noticeable. In an example shown in FIG. 13, an 8K4K picture is divided into four slice segments 1 to 4. Each of slice segments 1 to 3 is, for example, 8K×1.1K, and slice segment 4 is 8K×1K. In addition, adjacent slice segments overlap each other.

By doing so, motion compensation performed upon encoding can be efficiently performed on boundaries for a case of four divisions which are indicated by dotted lines, and thus, image quality of boundary portions improves. As such, degradation in the image quality of the boundary portions is reduced.

In this case, display unit 205 cuts out 8K×1K regions from 8K×1.1K regions and integrates the obtained regions. Note that transmitting apparatus 100 may separately transmit information indicating whether slice segments are encoded in an overlapping manner and indicating an overlapping range, such that the information is included in a multiplexed layer or encoded data.

Note that the same technique can also be applied to a case of using tiles.

Figure 14:
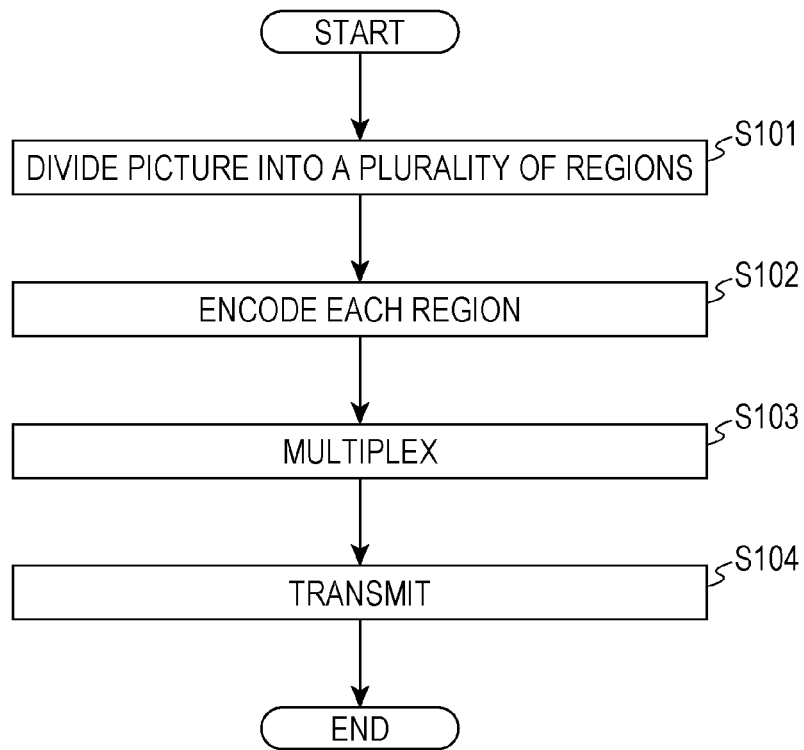
FIG. 14 is a flowchart of a transmission method according to the exemplary embodiment.

A flow of operation of transmitting apparatus 100 will be described below. FIG. 14 is a flowchart showing exemplary operation of transmitting apparatus 100.

First, encoder 101 divides a picture (access unit) into a plurality of slice segments (tiles) which are a plurality of regions (S101). Then, encoder 101 encodes the plurality of slice segments such that the plurality of slice segments can be decoded independently of each other, and thereby generates pieces of encoded data for the respective plurality of slice segments (S102). Note that encoder 101 may encode the plurality of slice segments by a single encoder or may perform a parallel process by a plurality of encoders.

Then, multiplexer 102 stores the plurality of pieces of encoded data generated by encoder 101, in a plurality of MMT packets, and thereby multiplexes the plurality of pieces of encoded data (S103). Specifically, as shown in FIGS. 8 and 9, multiplexer 102 stores the plurality of pieces of encoded data in a plurality of MMT packets such that pieces of encoded data for difference slice segments are not stored in one MMT packet. In addition, as shown in FIG. 8, multiplexer 102 stores control information which is shared between all decoding units in the picture, in MMT packet #1 which is different than a plurality of MMT packets #2 to #5 that store the plurality of pieces of encoded data. Here, the control information includes at least one of an access unit delimiter, SPS, PPS, and SEI.

Note that multiplexer 102 may store the control information in the same MMT packet as any of the plurality of MMT packets that store the plurality of pieces of encoded data. For example, as shown in FIG. 9, multiplexer 102 may store the control information in a first MMT packet (MMT packet #1 in FIG. 9) among the plurality of MMT packets that store the plurality of pieces of encoded data.

Finally, transmitting apparatus 100 transmits the plurality of MMT packets. Specifically, modulator 103 modulates the data obtained by the multiplexing, and transmitter 104 transmits the modulated data (S104).

Figure 15:
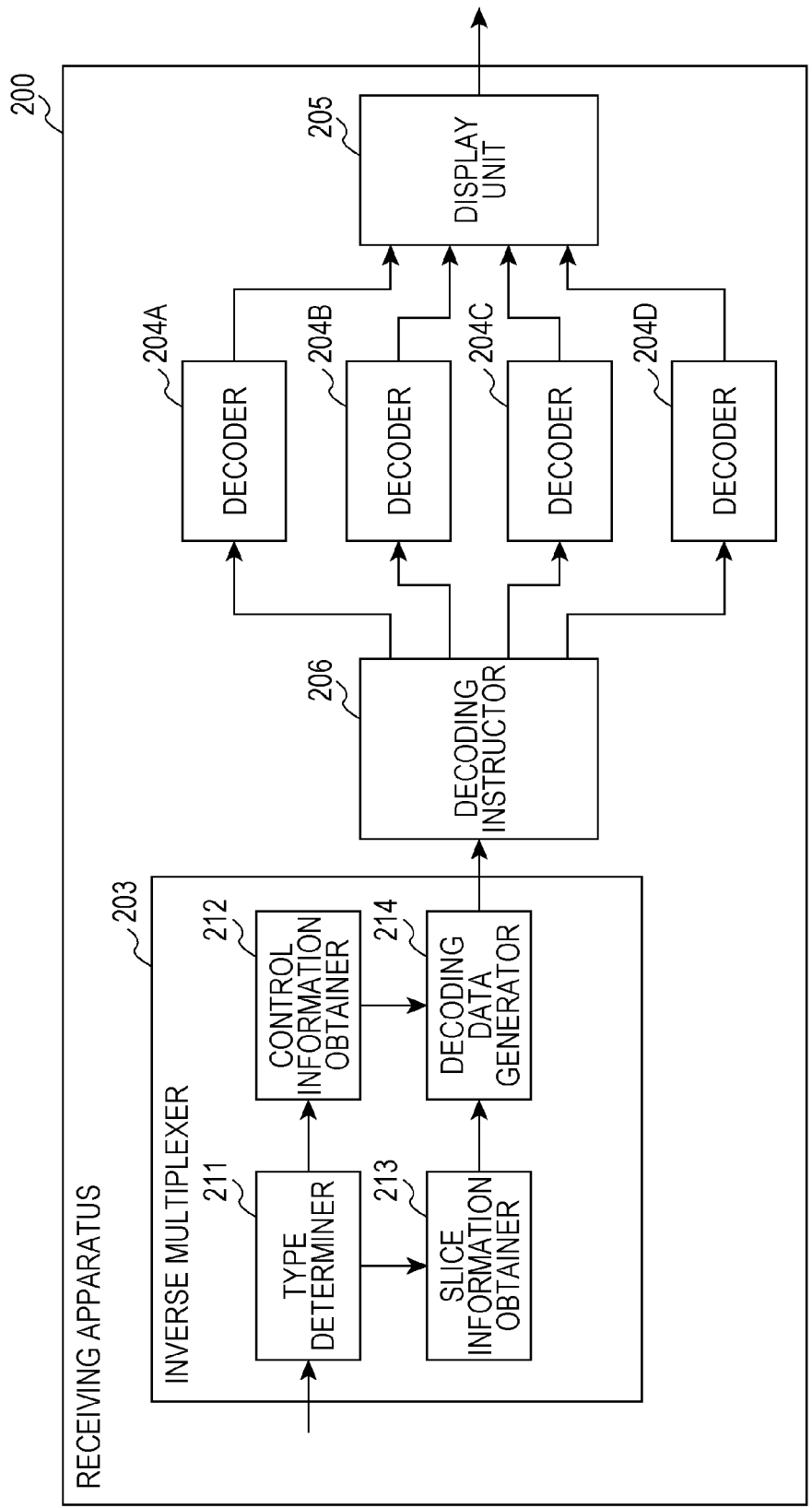
FIG. 15 is a block diagram of the receiving apparatus according to the exemplary embodiment.

FIG. 15 is a block diagram showing an exemplary configuration of receiving apparatus 200, and is a diagram showing detailed configurations of inverse multiplexer 203 and its subsequent stage shown in FIG. 7. As shown in FIG. 15, receiving apparatus 200 further includes decoding instructor 206. In addition, inverse multiplexer 203 includes type determiner 211, control information obtainer 212, slice information obtainer 213, and decoding data generator 214.

Figure 16:
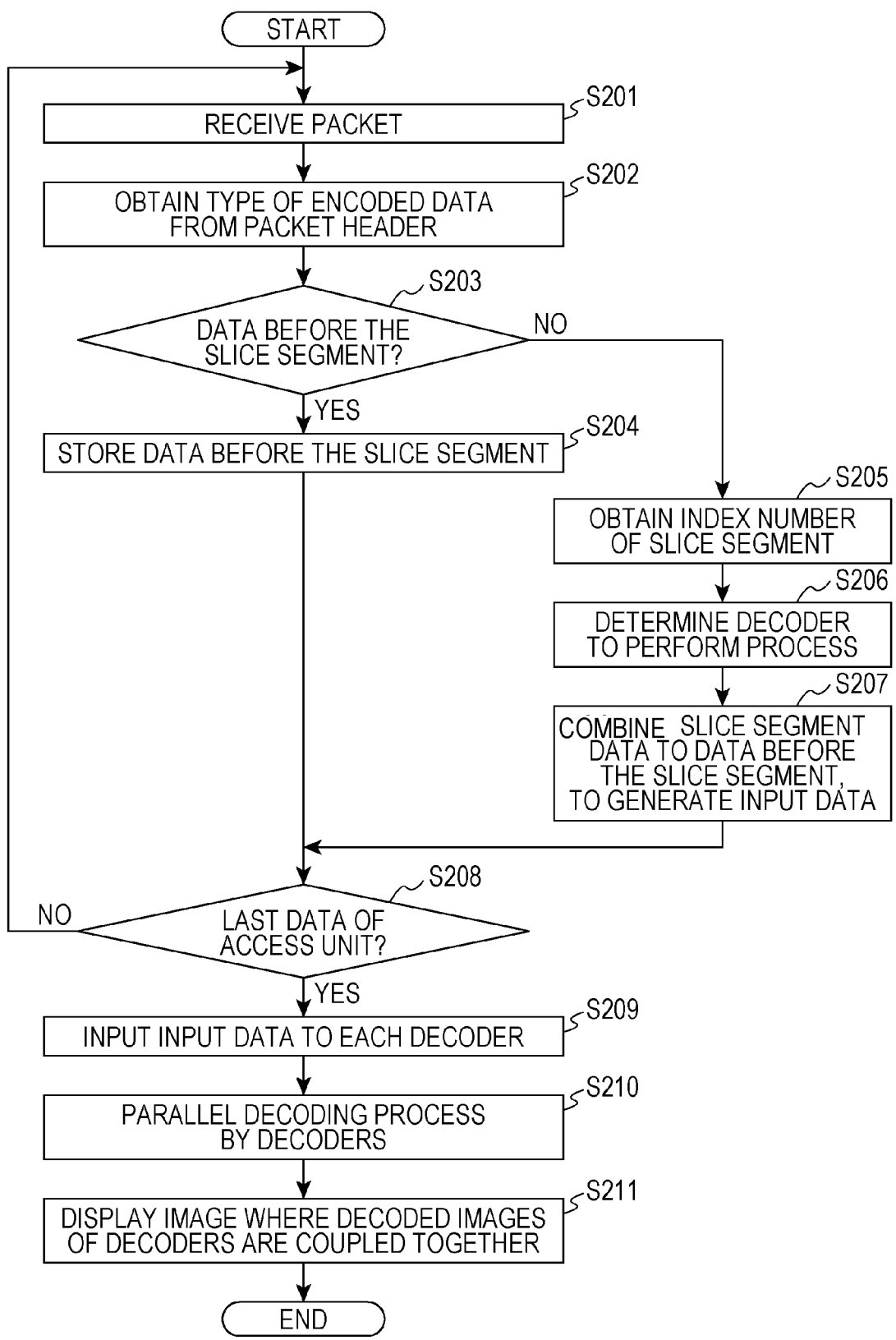
FIG. 16 is a flowchart of a reception method according to the exemplary embodiment.

A flow of operation of receiving apparatus 200 will be described below. FIG. 16 is a flowchart showing exemplary operation of receiving apparatus 200. Here, operation performed for one access unit is shown. When a decoding process for a plurality of access units is performed, processes of this flowchart are repeated.

First, receiving apparatus 200 receives, for example, a plurality of packets (MMT packets) generated by transmitting apparatus 100 (S201).

Then, type determiner 211 analyzes a header of a received packet and thereby obtains a type of encoded data stored in the received packet (S202).

Then, type determiner 211 determines, based on the obtained type of encoded data, whether the data stored in the received packet is data before the slice segment or slice segment data (S203).

If the data stored in the received packet is data before the slice segment (Yes at S203), control information obtainer 212 obtains data before the slice segment of a processing target access unit from a payload of the received packet, and stores the data before the slice segment in a memory (S204).

On the other hand, if the data stored in the received packet is slice segment data (No at S203), receiving apparatus 200 determines, using header information of the received packet, which one of a plurality of pieces of encoded data of the regions the data stored in the received packet is. Specifically, slice information obtainer 213 obtains index number Idx of a slice segment stored in the received packet, by analyzing the header of the received packet (S205). Specifically, index number Idx is an index number, in a movie fragment, of the access unit (a sample in MMT).

Note that the process at step S205 may be performed together with the process at step S202.

Then, decoding data generator 214 determines a decoder to decode the slice segment (S206). Specifically, index numbers Idx and the plurality of decoders are associated with each other in advance, and decoding data generator 214 determines a decoder associated with the index number Idx which is obtained at step S205, as a decoder to decode the slice segment.

Note that, as described in the example of FIG. 12, decoding data generator 214 may determine a decoder to decode the slice segment, based on at least one of resolution of the access unit (picture), a method for dividing the access unit into a plurality of slice segments (tiles), and processing capabilities of the plurality of decoders included in receiving apparatus 200. For example, decoding data generator 214 determines a method for dividing the access unit, based on identification information in an MMT message or a descriptor such as a TS section.

Then, decoding data generator 214 couples control information which is included in any of the plurality of packets and which is shared between all decoding units in the picture, to each of a plurality of pieces of encoded data of a plurality of slice segments, and thereby generates a plurality of pieces of input data (combined data) to be input to the plurality of decoders. Specifically, decoding data generator 214 obtains slice segment data from a payload of the received packet. Decoding data generator 214 couples the data before the slice segment which is stored in the memory at step S204, to the obtained slice segment data, and thereby generates input data to the decoder which is determined at step S206 (S207).

After step S204 or S207, if the data of the received packet is not last data of the access unit (No at S208), processes at and after step S201 are performed again. That is, the above-described processes are repeated until pieces of input data to a plurality of decoders 204A to 204D for all slice segments included in the access unit are generated.

Note that timing at which a packet is received is not limited to timing shown in FIG. 16, and a plurality of packets may be received in advance or sequentially and stored in the memory, etc.

On the other hand, if the data of the received packet is last data of the access unit (Yes at S208), decoding instructor 206 outputs the plurality of pieces of input data generated at step S207 to corresponding decoders 204A to 204D (S209).

Then, a plurality of decoders 204A to 204D decode the plurality of pieces of input data in parallel according to a DTS of the access unit, and thereby creates a plurality of decoded images (S210).

Finally, display unit 205 couples together the plurality of decoded images which are created by a plurality of decoders 204A to 204D, and thereby creates a display image and displays the display image according to a PTS of the access unit (S211).

Note that receiving apparatus 200 obtains the DTS and PTS of the access unit by analyzing payload data of an MMT packet that stores header information of an MPU or header information of a movie fragment. In addition, when TS is used as a multiplexing method, receiving apparatus 200 obtains the DTS and PTS of the access unit from a header of a PES packet. When RTP is used as a multiplexing method, receiving apparatus 200 obtains the DTS and PTS of the access unit from a header of an RTP packet.

In addition, when display unit 205 integrates decoding results obtained by the plurality of decoders, display unit 205 may perform a filtering process such as a deblocking filter on boundaries between adjacent division units. Note that, when a decoding result obtained by a single decoder is displayed, a filtering process is not necessary, and thus, display unit 205 may switch a process according to whether to perform a filtering process on boundaries between decoding results obtained by the plurality of decoders. Whether a filtering process is required may be defined in advance, for example, according to whether division is performed. Alternatively, information indicating whether a filtering process is required may be separately stored in a multiplexed layer. In addition, information required for a filtering process such as a filter coefficient may be stored in SPS, PPS, SEI, or a slice segment. Decoders 204A to 204D or inverse multiplexer 203 obtains these pieces of information by analyzing SEI, and outputs the obtained pieces of information to display unit 205. Display unit 205 performs a filtering process using these pieces of information. Note that, when these pieces of information are stored in a slice segment, it is desirable that decoders 204A to 204D obtain these pieces of information.

Note that, although the above description shows an example of a case in which there are two types of data stored in fragments, i.e., data before the slice segment and a slice segment, there may be three or more types of data. In this case, at step S203, case analysis according to the type is performed.

In addition, when a data size of a slice segment is large, transmitting apparatus 100 may fragment the slice segment and store the fragmented slice segments in MMT packets. That is, transmitting apparatus 100 may fragment data before the slice segment and a slice segment. If, in this case, an access unit and a Data unit are set to be equal to each other as in the example of packetization shown in FIG. 11, then the following problem occurs.

For example, when slice segment 1 is divided into three fragments, slice segment 1 is transmitted so as to be divided into three packets with a fragment counter value of 1 to 3. In addition, slice segment 2 and subsequent slice segments have a fragment counter value of 4 or greater. Thus, correspondence between fragment counter values and pieces of data stored in payloads cannot be established. Accordingly, receiving apparatus 200 cannot identify a packet that stores first data of a slice segment, from header information of an MMT packet.

In such a case, receiving apparatus 200 may identify a start position of a slice segment by analyzing payload data of an MMT packet. Here, as a format for storing NAL units in a multiplexed layer in H.264 or H.265, there are two types of formats: a format called a byte stream format where a start code including a specific bit string is added immediately before a NAL unit header; and a format called a NAL size format where a field indicating a size of a NAL unit is added.

The byte stream format is used in an MPEG-2 system, RTP, and the like. The NAL size format is used in MP4, and DASH and MMT that use MP4, and the like.

When the byte stream format is used, receiving apparatus 200 analyzes whether first data of a packet matches a start code. If first data of a packet matches a start code, receiving apparatus 200 can detect whether data included in the packet is slice segment data, by obtaining a type of a NAL unit from a NAL unit header that follows the start code.

On the other hand, in a case of the NAL size format, receiving apparatus 200 cannot detect a start position of a NAL unit based on the bit string. Therefore, in order to obtain a start position of a NAL unit, receiving apparatus 200 needs to shift a pointer by reading an amount of data corresponding to a size of a NAL unit sequentially from a first NAL unit of an access unit.

Note, however, that when a size of a subsample unit is indicated in a header of an MPU or a movie fragment in MMT, and a subsample corresponds to data before a slice segment or the slice segment, receiving apparatus 200 can identify a start position of each NAL unit based on size information of the subsample. Hence, transmitting apparatus 100 may include information indicating whether subsample unit information is present in an MPU or a movie fragment, in information that is obtained by receiving apparatus 200 upon start of reception of data, such as an MPT (MMT Package Table) in MMT.

Note that MPU data is data extended on a basis of MP4 format. MP4 has a mode in which parameter sets such as SPS and PPS in H.264 or H.265 can be stored as sample data, and a mode in which parameter sets cannot be stored. In addition, information for identifying the modes is indicated as an entry name of SampleEntry. When the mode in which parameter sets can be stored is used, and parameter sets are included in a sample, receiving apparatus 200 obtains the parameter sets by the above-described method.

On the other hand, when the mode in which parameter sets cannot be stored is used, parameter sets are stored as decoder specific information in SampleEntry, or stored using a parameter set stream. Here, since the parameter set stream is not generally used, it is desirable that transmitting apparatus 100 store parameter sets in decoder specific information. In this case, receiving apparatus 200 obtains parameter sets to be referred to by an access unit, by analyzing SampleEntry which is transmitted as MPU metadata or movie fragment metadata in an MMT packet.

When parameter sets are stored as sample data, receiving apparatus 200 can obtain parameter sets required for decoding only by referring to the sample data without referring to SampleEntry. At this time, transmitting apparatus 100 does not need to store parameter sets in SampleEntry. By doing so, since transmitting apparatus 100 can use the same SampleEntry for different MPUs, processing load of transmitting apparatus 100 upon generation of an MPU can be reduced. Furthermore, there is an advantage in that receiving apparatus 200 does not need to refer to parameter sets in SampleEntry.

Alternatively, transmitting apparatus 100 may store one default parameter set in SampleEntry, and store parameter sets to be referred to by an access unit, in sample data. In conventional MP4, it is common to store parameter sets in SampleEntry. Thus, when parameter sets are not present in SampleEntry, there may be a receiving apparatus that stops playback. By using the above-described method, this problem can be solved.

Alternatively, transmitting apparatus 100 may store parameter sets in sample data only when parameter sets different than the default parameter set are used.

Note that, since in both modes parameter sets can be stored in SampleEntry, transmitting apparatus 100 may always store parameter sets in VisualSampleEntry, and receiving apparatus 200 may always obtain the parameter sets from VisualSampleEntry.

Note that, although, in an MMT standard, MP4 header information such as Moov and Moof is called MPU metadata, transmitting apparatus 100 does not necessarily need to transmit the MPU metadata. Furthermore, receiving apparatus 200 can also determine whether SPS and PPS are stored in sample data, based on an ARIB (Association of Radio Industries and Businesses) standard service, an asset type, whether MPU metadata is transmitted, or the like.

FIG. 17 is a diagram showing an example of a case in which data before the slice segment and each slice segment are set as different Data units.

In the example shown in FIG. 17, data sizes of data before the slice segment and slice segments 1 to 4 are Length #1 to Length #5, respectively. Field values of a fragmentation indicator, a fragment counter, and an offset which are included in a header of each MMT packet are as shown in the drawing.

Here, the offset is offset information indicating a bit length (offset) from a start of encoded data of a sample (access unit or picture) to which payload data belongs, to a first byte of the payload data (encoded data) included in the MMT packet. Note that although description is made such that a fragment counter value starts from a value obtained by subtracting 1 from a total number of fragments, the fragment counter value may start from other values.

FIG. 18 is a diagram showing an example of a case in which a Data unit is fragmented. In the example shown in FIG. 18, slice segment 1 is divided into three fragments, and the three fragments are stored in MMT packet #2 to MMT packet #4, respectively. At this time, too, when data sizes of the fragments are Length #2_1 to Length #2_3, respectively, field values are as shown in the drawing.

When a data unit such as a slice segment is thus set as a Data unit, a start of an access unit and a start of a slice segment can be determined as follows based on field values of an MMT packet header.

A start of a payload of a packet with an offset value of 0 is a start of the access unit.

A start of a payload of a packet with an offset value different than 0 and with a fragmentation indicator value of 00 or 01 is a start of a slice segment.

In addition, when fragmentation of a Data unit does not occur and packet loss does not occur, either, receiving apparatus 200 can identify an index number of a slice segment stored in an MMT packet, based on a number of slice segments obtained after detecting a start of an access unit.

In addition, when a Data unit of data before the slice segment is fragmented, too, likewise, receiving apparatus 200 can detect starts of an access unit and a slice segment.

In addition, when packet loss occurs or when SPS, PPS, and SEI which are included in data before the slice segment are set as different Data units, too, receiving apparatus 200 can identify a start position of a slice segment or a tile in a picture (access unit) by identifying an MMT packet that stores first data of a slice segment based on a result of analysis of an MMT header, and then analyzing a header of the slice segment. Workload for the analysis of the header of the slice segment is low and thus processing load is not problematic.

As such, each of a plurality of pieces of encoded data of a plurality of slice segments has a one-to-one correspondence with a basic data unit (Data unit) which is a unit of data stored in one or more packets. In addition, each of the plurality of pieces of encoded data is stored in one or more MMT packets.

Header information of each MMT packet includes a fragmentation indicator (identification information) and an offset (offset information).

Receiving apparatus 200 receiving apparatus 200 determines a start of payload data included in a packet having header information that includes a fragmentation indicator value of 00 or 01, as a start of encoded data of each slice segment. Specifically, a start of payload data included in a packet having header information that includes an offset value of not 0 and a fragmentation indicator value of 00 or 01 is determined as a start of encoded data of each slice segment.

In addition, in the example of FIG. 17, a start of a Data unit is either a start of an access unit or a start of a slice segment, and a fragmentation indicator value is 00 or 01. Furthermore, by receiving apparatus 200 determining whether a start of a Data unit is an access unit delimiter or a slice segment by referring to a type of a NAL unit, receiving apparatus 200 can also detect a start of an access unit or a start of a slice segment without referring to an offset.

As such, by transmitting apparatus 100 performing packetization such that a start of a NAL unit always starts with a start of a payload of an MMT packet, receiving apparatus 200 can detect a start of an access unit or a slice segment by analyzing a fragmentation indicator and a NAL unit header, in a case, too, in which data before the slice segment is divided into a plurality of Data units. A NAL unit type is present in a first byte of a NAL unit header. Therefore, receiving apparatus 200 can obtain a NAL unit type by additionally analyzing data of one byte when a header portion of an MMT packet is analyzed. In a case of audio, receiving apparatus 200 only needs to detect a start of an access unit, and may make a determination based on whether a fragmentation indicator value is 00 or 01.

In addition, as described above, when encoded data which is encoded so as to allow division decoding is stored in an MPEG-2 TS PES packet, transmitting apparatus 100 can use a data alignment descriptor. An example of a method for storing encoded data in a PES packet will be described in detail below.

For example, in HEVC, transmitting apparatus 100 can indicate whether data stored in a PES packet is an access unit, a slice segment, or a tile, by using a data alignment descriptor. Alignment types in HEVC are defined as follows.

Alignment type=8 indicates an HEVC slice segment. Alignment type=9 indicates an HEVC slice segment or access unit. Alignment type=12 indicates an HEVC slice segment or tile.

Thus, by using, for example, type 9, transmitting apparatus 100 can indicate that a PES packet data is either a slice segment or data before the slice segment. Since a type that indicates a slice instead of a slice segment is also separately defined, transmitting apparatus 100 may use a type that indicates a slice instead of a slice segment.

In addition, a DTS and a PTS which are included in a header of a PES packet are set only in a PES packet including first data of an access unit. Therefore, when the type is 9 and a PES packet has a DTS or PTS field, receiving apparatus 200 can determine that the PES packet stores a whole access unit or a first division unit of the access unit.

In addition, transmitting apparatus 100 may allow receiving apparatus 200 to distinguish data included in a packet, by using a field such as transport_ priority indicating a priority level of a TS packet that stores a PES packet including first data of an access unit. In addition, receiving apparatus 200 may determine data included in a packet, by analyzing whether a payload of a PES packet is an access unit delimiter. In addition, a data_alignment_indicator in a PES packet header indicates whether a PES packet stores data, according to these types. When this flag (data_alignment_indicator) is set to 1, it is guaranteed that data stored in a PES packet follows a type provided in a data alignment descriptor.

In addition, transmitting apparatus 100 may use a data alignment descriptor only when PES packetization is performed in division decodable units such as slice segments. By this, when there is a data alignment descriptor, receiving apparatus 200 can determine that encoded data is PES-packetized in division decodable units. When there is no data alignment descriptor, receiving apparatus 200 can determine that encoded data is PES-packetized in units of access units. Note that a fact that a unit of PES packetization is an access unit when the data_alignment_indicator is set to 1 and when there is no data alignment descriptor is defined in an MPEG-2 TS standard.

When a PMT (Program Map Table) includes a data alignment descriptor, receiving apparatus 200 determines that PES packetization is performed in division decodable units, and can generate input data to each decoder based on the packetized units. In addition, when the PMT does not include a data alignment descriptor and it is determined, based on program information or other descriptor information, that parallel decoding of encoded data is required, receiving apparatus 200 generates input data to each decoder by analyzing slice headers of slice segments, etc. In addition, when encoded data can be decoded by a single decoder, receiving apparatus 200 decodes all data of an access unit using the decoder. Note that, when information indicating whether encoded data is composed of division decodable units such as slice segments or tiles is separately provided in a PMT descriptor, etc., receiving apparatus 200 may determine, based on a result of analysis of the descriptor, whether the encoded data can be decoded in parallel.

In addition, a DTS and a PTS which are included in a header of a PES packet are set only in a PES packet including first data of an access unit. Thus, when an access unit is divided and PES-packetized, second and subsequent PES packets do not include information indicating a DTS and a PTS of the access unit. Therefore, when a decoding process is performed in parallel, each of decoders 204A to 204D and display unit 205 use a DTS and a PTS which are stored in a header of a PES packet including first data of the access unit.

Although a transmitting apparatus, a receiving apparatus, a transmission method, and a reception method according to the exemplary embodiment are described above, the present disclosure is not limited to the exemplary embodiment.

In addition, each processor included in the transmitting apparatus and the receiving apparatus according to the above-described exemplary embodiment is typically implemented as an LSI which is an integrated circuit. The processors may be individually formed in one chip, or may be formed in one chip so as to include some or all of the processors.

In addition, an integrated circuit is not limited to an LSI, and may be implemented by a dedicated circuit or a universal processor. An FPGA (Field Programmable Gate Array) that can be programmed after manufacturing an LSI, or a reconfigurable processor that can reconfigure connections or settings of circuit cells in an LSI may be used.

In the above-described exemplary embodiments, each component may be configured by dedicated hardware or may be implemented by executing a software program suitable for each component. Each component may be implemented by a program executor, such as a CPU or a processor, reading and executing a software program recorded in a recording medium such as a hard disk or a semiconductor memory.

In other words, the transmitting apparatus and the receiving apparatus include processing circuitry and a storage which is electrically connected to the processing circuitry (which is accessible from the processing circuitry). The processing circuitry includes at least one of dedicated hardware and a program executor. In addition, when the processing circuitry includes the program executor, the storage stores a software program to be executed by the program executor. The processing circuitry performs the transmission method or reception method according to the above-described exemplary embodiment, using the storage.

Furthermore, the present disclosure may be the above-described software program or may be a non-transitory computer-readable recording medium where the above-described program is recorded. In addition, needless to say, the above-described program can be distributed through a transmission medium such as the Internet.

In addition, numbers used above are all exemplification to specifically describe the present disclosure and thus the present disclosure is not limited to the exemplified numbers.

In addition, division of functional blocks in the block diagrams is an example. Thus, a plurality of functional blocks may be implemented as one functional block, or one functional block may be divided into a plurality of blocks, or one function may be transferred to another functional block. In addition, functions of a plurality of functional blocks having similar functions may be processed in parallel or in a time division manner by a single piece of hardware or software.

In addition, order in which steps included in the above-described transmission method or reception method are performed is exemplification to specifically describe the present disclosure, and thus, the order may be other than that described above. In addition, any one of the above-described steps may be performed simultaneously (in parallel) with another step.

Although a transmitting apparatus, a receiving apparatus, a transmission method, and a reception method according to one or a plurality of aspects of the present disclosure are described above based on the exemplary embodiment, the present disclosure is not limited to the exemplary embodiment. A mode where various modifications with which one skilled in the art would come up are made to the present exemplary embodiment and a mode constructed by combining together components of different exemplary embodiments may also be included in the scope of the one or plurality of aspects of the present disclosure without departing from the spirit and scope of the present disclosure.

The present disclosure can be applied to apparatuses or devices that perform media transport of video data, audio data, and the like.

What is claimed is:

1. A transmission method comprising:
   dividing a picture into a plurality of regions;
   generating a plurality of pieces of encoded data that respectively correspond to the plurality of regions by encoding the plurality of regions such that each of the plurality of regions is decoded independently;
   packetizing the generated plurality of pieces of encoded data by storing in a plurality of Packetized Elementary Streams (PES) packets, MPEP Media Transport (MMT) packets, or Real-time Transport Protocol (RTP) packets such that pieces of encoded data for different regions are not stored in a single packet, and storing control information in a single different packet that is different from the plurality of packets where the plurality of pieces of encoded data are stored, the control information being commonly used for all decoding units in the picture for decoding the entire picture; and
   transmitting, as data for the picture, the different packet and the plurality of packets in a same location where the plurality of pieces of encoded data are stored,
   wherein the different packet is a front end packet in the data for the picture, and in the data for the picture, the control information is included only in the different packet,
   the header information of each of the packets includes identification information indicating any one of: (1) only the packet is included in the basic data unit; (2) a plurality of packets are included in the basic data unit, and the packet is a first packet of the basic data unit; (3) a plurality of packets are included in the basic data unit, and the packet is a packet other than the first packet and a last packet of the basic data unit; and (4) a plurality of packets are included in the basic data unit, and the packet is the last packet of the basic data unit,
   the identification information includes two-bit values corresponding to (1)-(4), each two-bit value being different for each of (1)-(4), and
   the header information of the packet further includes offset information indicating a bit length from a start of encoded data of the picture that includes the plurality of pieces of encoded data to a start of a piece of encoded data included in the packet.

2. A reception method for a receiving apparatus including a plurality of decoders, the reception method comprising:
   receiving a plurality of Packetized Elementary Streams (PES) packets, MPEP Media Transport (MMT) packets, or Real-time Transport Protocol (RTP) packets, the plurality of packets being obtained by packetizing a plurality of pieces of encoded data, the plurality of pieces of encoded data being obtained by encoding a plurality of regions of a picture such that the plurality of regions are decoded independently, the plurality of regions being obtained by dividing the picture, and the packetization being performed such that pieces of encoded data for different regions are not stored in a single packet;

receiving control information, the control information being stored in a single different packet that is different from the plurality of packets where the plurality of pieces of encoded data are stored, the control information being commonly used for all decoding units in the picture for decoding the entire picture;

combining control information and each of the plurality of pieces of encoded data of the plurality of regions, to generate a plurality of pieces of combined data; and decoding the plurality of pieces of combined data in parallel by using the plurality of decoders, wherein the different packet and the plurality of packets are received as data for the picture in a same location where the plurality of pieces of encoded data are stored, the different packet is a front end packet in the data for the picture, and in the data for the picture, the control information is included only in the different packet, the header information of each of the packets includes identification information indicating any one of: (1) only the packet is included in the basic data unit; (2) a plurality of packets are included in the basic data unit, and the packet is a first packet of the basic data unit; (3) a plurality of packets are included in the basic data unit, and the packet is a packet other than the first packet and a last packet of the basic data unit; and (4) a plurality of packets are included in the basic data unit, and the packet is the last packet of the basic data unit, the identification information includes two-bit values corresponding to (1)-(4), each two-bit value being different for each of (1)-(4), and the header information of the packet further includes offset information indicating a bit length from a start of encoded data of the picture that includes the plurality of pieces of encoded data to a start of a piece of encoded data included in the packet.

3. The reception method according to claim 2, wherein the combining includes determining, using header information of a packet, which region among the plurality of regions corresponds to a piece of data stored in the packet.

4. The reception method according to claim 3,
wherein each of the plurality of pieces of encoded data has a one-to-one correspondence with a basic data unit, the basic data unit being a unit of data stored in one or more packets, wherein each of the plurality of pieces of encoded data is stored in the one or more packets, and wherein the combining includes determining that a start of payload data included in a packet having the header information that includes the identification information indicating that (1) only the packet is included in the basic data unit or (2) a plurality of packets are included in the basic data unit, and that the packet is a first packet of the basic data unit, is a start of the piece of encoded data of each of the plurality of regions.

5. The reception method according to claim 4,
wherein
the combining includes determining that a start of payload data included in a packet having the header information that includes: the identification information indicating that (1) only the packet is included in the basic data unit or (2) a plurality of packets are included in the basic data unit, and that the packet is a first packet of the basic data unit; and the offset information indicating a bit length of not zero, is a start of the piece of encoded data of each of the plurality of regions.

6. The reception method according to claim 3, further comprising determining one of the plurality of decoders to be used to decode the plurality of pieces of combined data, respectively, based on at least one of resolution of the picture, a method for dividing the picture into the plurality of regions, and processing capabilities of the plurality of decoders.

7. A transmitting apparatus comprising:
a divider that divides a picture into a plurality of regions;
an encoder that generates a plurality of pieces of encoded data that respectively correspond to the plurality of regions by encoding the plurality of regions such that each of the plurality of regions is decoded independently;
a packetizer that stores the generated plurality of pieces of encoded data in a plurality of Packetized Elementary Streams (PES) packets, MPEP Media Transport (MMT) packets, or Real-time Transport Protocol (RTP) packets such that pieces of encoded data for different regions are not stored in one packet, and stores control information in a single different packet that is different from the plurality of packets where the plurality of pieces of encoded data are stored, the control information being commonly used for all decoding units in the picture for decoding the entire picture; and
a transmitter that transmits, as data for the picture, the different packet and the plurality of packets in a same location where the plurality of pieces of encoded data are stored,
wherein the different packet is a front end packet in the data for the picture, and in the data for the picture, the control information is included only in the different packet,
the header information of each of the packets includes identification information indicating any one of: (1) only the packet is included in the basic data unit; (2) a plurality of packets are included in the basic data unit, and the packet is a first packet of the basic data unit; (3) a plurality of packets are included in the basic data unit, and the packet is a packet other than the first packet and a last packet of the basic data unit; and (4) a plurality of packets are included in the basic data unit, and the packet is the last packet of the basic data unit,
the identification information includes two-bit values corresponding to (1)-(4), each two-bit value being different for each of (1)-(4), and
the header information of the packet further includes offset information indicating a bit length from a start of encoded data of the picture that includes the plurality of pieces of encoded data to a start of a piece of encoded data included in the packet.

8. A receiving apparatus comprising:
a receiver that receives a plurality of Packetized Elementary Streams (PES) packets, MPEP Media Transport (MMT) packets, or Real-time Transport Protocol (RTP) packets, the plurality of packets being obtained by packetizing a plurality of pieces of encoded data, the plurality of pieces of encoded data being obtained by encoding a plurality of regions of a picture such that the plurality of regions are decoded independently, the plurality of regions being obtained by dividing the picture, the packetization being performed such that pieces of encoded data for different regions are not stored in a single packet, and receives control information being stored in a single different packet that is different from the plurality of packets where the plurality of pieces of encoded data are stored, the control information being commonly used for all decoding units in the picture for decoding the entire picture;

a combiner that combines control information and each of the plurality of pieces of encoded data of the plurality of regions, to generate a plurality of pieces of combined data; and a plurality of decoders that decode the plurality of pieces of combined data in parallel, wherein the different packet and the plurality of packets are received as data for the picture in a same location where the plurality of pieces of encoded data are stored, the different packet is a front end packet in the data for the picture, and in the data for the picture, the control information is included only in the different packet, the header information of each of the packets includes identification information indicating any one of: (1) only the packet is included in the basic data unit; (2) a plurality of packets are included in the basic data unit, and the packet is a first packet of the basic data unit; (3) a plurality of packets are included in the basic data unit, and the packet is a packet other than the first packet and a last packet of the basic data unit; and (4) a plurality of packets are included in the basic data unit, and the packet is the last packet of the basic data unit, the identification information includes two-bit values corresponding to (1)-(4), each two-bit value being different for each of (1)-(4), and the header information of the packet further includes offset information indicating a bit length from a start of encoded data of the picture that includes the plurality of pieces of encoded data to a start of a piece of encoded data included in the packet.

* * * * *